US010056959B2

(12) United States Patent
Lu et al.

(10) Patent No.: US 10,056,959 B2
(45) Date of Patent: Aug. 21, 2018

(54) DIRECTIONAL DIRECTION SELECTION METHOD, APPARATUS, AND SYSTEM

(71) Applicant: Huawei Technologies Co., Ltd., Shenzhen, Guangdong (CN)

(72) Inventors: Weishan Lu, Shenzhen (CN); Tao Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 153 days.

(21) Appl. No.: 15/266,770

(22) Filed: Sep. 15, 2016

(65) Prior Publication Data

US 2017/0005714 A1 Jan. 5, 2017

Related U.S. Application Data

(63) Continuation of application No. PCT/CN2014/073623, filed on Mar. 18, 2014.

(51) Int. Cl.
*H04B 7/06* (2006.01)
*H04W 72/08* (2009.01)
*H04B 7/08* (2006.01)

(52) U.S. Cl.
CPC ......... *H04B 7/0632* (2013.01); *H04B 7/0617* (2013.01); *H04B 7/0695* (2013.01); *H04B 7/088* (2013.01); *H04W 72/085* (2013.01); *H04B 7/0684* (2013.01)

(58) Field of Classification Search
CPC ............ H01Q 3/24; H01Q 1/243; H01Q 3/44; H01Q 13/20; H01Q 21/065
See application file for complete search history.

(56) References Cited

U.S. PATENT DOCUMENTS

2010/0297957 A1 11/2010 Rofougaran
2013/0137444 A1 5/2013 Ozluturk
2013/0315325 A1 11/2013 Wang et al.

FOREIGN PATENT DOCUMENTS

CN 101689712 A 3/2010
CN 102084546 A 6/2011
CN 102983899 A 3/2013
WO 2013181823 A1 12/2013

Primary Examiner — Jung Park

(57) ABSTRACT

Embodiments of the present invention disclose a directional direction selection method, apparatus, and system. The method includes: sending L groups of pilots in an omnidirectional direction manner, where the L groups of pilots are received by UE by using L directional directions, and the L groups of pilots are used by the UE to switch to a directional direction with best channel quality in the L directional directions; sending, by a base station, S groups of pilots by using S directional directions respectively; determining, by the base station, an optimal directional direction in the S directional directions according to the channel quality corresponding to the S groups of pilots; and switching, by the base station, to the optimal directional direction in the S directional directions.

20 Claims, 23 Drawing Sheets

DIRECTIONAL DIRECTION SELECTION METHOD, APPARATUS, AND SYSTEM

CROSS-REFERENCE TO RELATED APPLICATIONS

This application is a continuation of International Application No. PCT/CN2014/073623, filed on Mar. 18, 2014, which is hereby incorporated by reference in its entirety.

TECHNICAL FIELD

The present invention relates to the field of communications technologies, and more specifically, to a directional direction selection method, apparatus, and system.

BACKGROUND

A pattern reconfigurable antenna refers to an antenna whose antenna directivity pattern is changed by changing current distribution in an antenna unit.

In a communications system, a pattern reconfigurable antenna may be configured on both a base station and user equipment (UE). The pattern reconfigurable antenna configured on the base station may support omnidirectional directions and M different directional directions (M≥1), and the pattern reconfigurable antenna configured on the UE may support N different directional directions (N≥1). The omnidirectional directions indicate that a directivity pattern has basically same performance in all directions on a horizontal plane or a vertical plane, and antenna gains are basically the same in all angles on the horizontal plane or the vertical plane, that is, an antenna is not directional. The directional direction indicates that a directivity pattern has strong power in some space angles but has weak power in some other space angles, that is, an antenna is directional.

If the pattern reconfigurable antenna is configured on both the base station and the UE, the directional directions of the base station and the directional directions of the UE have M×N combination manners. An optimal combination manner may be determined by using an exhaustive attack method. However, complexity of the exhaustive attack method is O(M×N), and the complexity is relatively high.

SUMMARY

In view of this, an objective of embodiments of the present invention is to provide a directional direction selection method, apparatus, and system to resolve the foregoing problem of relatively high complexity.

To achieve the foregoing objective, the following technical solutions are provided in the embodiments of the present invention:

According to a first aspect of the embodiments of the present invention, a directional direction selection method is provided, including:

sending, by a base station, L groups of pilots in an omnidirectional direction manner, where the L groups of pilots are received by UE by using L directional directions, the L directional directions are in a one-to-one correspondence with the L groups of pilots, the L groups of pilots are used by the UE to estimate channel quality corresponding to each directional direction in the L directional directions and switch to a directional direction with best channel quality in the L directional directions, L is less than or equal to N, and N is a quantity of reconfigurable directional directions supported by the UE;

sending, by the base station, S groups of pilots by using S directional directions respectively, where the S groups of pilots are received by the UE by using the directional direction with the best channel quality in the L directional directions, the S groups of pilots are in a one-to-one correspondence with the S directional directions, 1≤S≤M, M is a quantity of reconfigurable directional directions supported by the base station, and the S groups of pilots are used by the UE to estimate channel quality corresponding to the S directional directions;

determining, by the base station, an optimal directional direction in the S directional directions according to the channel quality corresponding to the S groups of pilots, where the optimal directional direction in the S directional directions is represented as an $m_{opt}$ directional direction; and switching, by the base station, to the optimal directional direction in the S directional directions.

With reference to the first aspect, in a first possible implementation manner, the determining an optimal directional direction in the S directional directions according to the channel quality corresponding to the S groups of pilots includes: receiving, by the base station, channel quality information fed back by the UE; and determining, by the base station, the optimal directional direction in the S directional directions according to the channel quality information, where the channel quality information includes the channel quality corresponding to the S directional directions, or a directional direction with best channel quality in the S directional directions and channel quality corresponding to the directional direction with the best channel quality in the S directional directions.

With reference to the first aspect, in a second possible implementation manner, the determining an optimal directional direction in the S directional directions according to the channel quality corresponding to the S groups of pilots includes: receiving, by the base station, a directional direction with best channel quality in the S directional directions that is fed back by the UE; and determining, by the base station, the optimal directional direction in the S directional directions according to the directional direction with the best channel quality.

With reference to the first possible implementation manner of the first aspect, in a third possible implementation manner, a quantity of the UEs is K, K is greater than or equal to 2, and the method further includes: allocating, by the base station, a sub-channel to each UE.

With reference to the third possible implementation manner of the first aspect, in a fourth possible implementation manner, the determining the optimal directional direction in the S directional directions includes: calculating, according to the channel quality information, a total system capacity corresponding to each directional direction in the S directional directions; and determining a directional direction corresponding to a maximum value of the total system capacities as the optimal directional direction.

With reference to the fourth possible implementation manner of the first aspect, in a fifth possible implementation manner, the calculating, according to the channel quality information, a total system capacity corresponding to each directional direction in the S directional directions includes: calculating a total system capacity corresponding to the $m^{th}$ directional direction in the S directional directions according to a formula $$C_m = \sum_{j=1}^{J} \max_{k=1,2,\ldots K} \log_2(1 + G_k^d(m, n_k^*)_j),$$

where $1 \leq m \leq S$, J represents a total quantity of sub-channels, d represents directional, j represents a serial number of a sub-channel, $n_k^*$ represents a directional direction with best channel quality of the $k^{th}$ UE, $C_m$ represents the total system capacity corresponding to the $m^{th}$ directional direction, $\log_2(1+G_k^d(m,n_k^*)_j)$ represents a channel capacity that is of the $j^{th}$ sub-channel and corresponding to the $k^{th}$ UE when the $k^{th}$ UE uses the $n_k^*$ directional direction and the base station uses the $m^{th}$ directional direction; $G_k^d(m,n_k^*)_j$ represents channel quality that is of the $j^{th}$ sub-channel and corresponding to the $k^{th}$ UE when the $k^{th}$ UE uses the $n_k^*$ directional direction and the base station uses the $m^{th}$ directional direction, and $$\max_{k=1,2\ldots K} \log_2(1+G_k(m,n_k^*)_j)$$

represents a maximum channel capacity that is of the $j^{th}$ sub-channel and obtained when the base station uses the $m^{th}$ directional direction.

With reference to the fifth possible implementation manner of the first aspect, in a sixth possible implementation manner, the allocating a sub-channel to each UE includes: comparing channel capacities of the $j^{th}$ sub-channel that are corresponding to the UEs when the base station uses the $m_{opt}$ directional direction and the UEs use directional directions with best channel quality; and allocating the $j^{th}$ sub-channel to UE corresponding to a maximum channel capacity value.

With reference to the third possible implementation manner of the first aspect, in a seventh possible implementation manner, after the determining the optimal directional direction and before the allocating a sub-channel to each UE, the method further includes: sending, by the base station, $L_1$ groups of pilots by using the $m_{opt}$ directional direction, where the $L_1$ groups of pilots are received by the UE by using $L_1$ directional directions, the $L_1$ directional directions are in a one-to-one correspondence with the $L_1$ groups of pilots, $1 \leq L_1 \leq N$, and the $L_1$ groups of pilots are used by the UE to estimate channel quality corresponding to each directional direction in the $L_1$ directional directions and switch to a directional direction with best channel quality in the $L_1$ directional directions.

With reference to the seventh possible implementation manner of the first aspect, in an eighth possible implementation manner, after the sending $L_1$ groups of pilots, the method further includes: receiving, by the base station, channel quality that is of each sub-channel, fed back by each UE, and corresponding to the directional direction with the best channel quality in the $L_1$ directional directions.

With reference to the eighth possible implementation manner of the first aspect, in a ninth possible implementation manner of the first aspect, the allocating a sub-channel to each UE includes: comparing channel capacities of the $j^{th}$ sub-channel that are corresponding to the UEs when the UEs use the directional directions with the best channel quality in the $L_1$ directional directions; and allocating the $j^{th}$ sub-channel to UE corresponding to a maximum channel capacity value.

According to a second aspect of the embodiments of the present invention, a directional direction selection method is provided, including:

sending, by a base station, L groups of pilots in an omnidirectional direction manner, where the L groups of pilots are received by UE by using L directional directions, the L directional directions are in a one-to-one correspondence with the L groups of pilots, the L groups of pilots are used by the UE to estimate channel quality corresponding to each directional direction in the L directional directions and switch to a directional direction with best channel quality in the L directional directions, L is less than or equal to N, and N is a quantity of reconfigurable directional directions supported by the UE;

receiving, by the base station, S groups of pilots by using S directional directions respectively, where the S groups of pilots are sent by the UE by using the directional direction with the best channel quality in the L directional directions, the S groups of pilots are in a one-to-one correspondence with the S directional directions, $1 \leq S \leq M$, and M is a quantity of reconfigurable directional directions supported by the base station;

performing, by the base station by using the S groups of pilots, channel estimation to obtain channel quality corresponding to each directional direction in the S directional directions;

determining, by the base station, an optimal directional direction in the S directional directions according to the channel quality information, where the optimal directional direction in the S directional directions is represented as an $m_{opt}$ directional direction; and switching, by the base station, to the optimal directional direction in the S directional directions.

With reference to the second aspect, in a first possible implementation manner, a quantity of the UEs is K, K is greater than or equal to 2, and the method further includes: allocating, by the base station, a sub-channel to each UE.

With reference to the first possible implementation manner of the second aspect, in a second possible implementation manner, the determining an optimal directional direction in the S directional directions includes: calculating, according to the channel quality information, a total system capacity corresponding to each directional direction in the S directional directions; and determining a directional direction corresponding to a maximum value of the total system capacities as the optimal directional direction.

With reference to the second possible implementation manner of the second aspect, in a third possible implementation manner, the calculating, according to the channel quality information, a total system capacity corresponding to each directional direction in the S directional directions includes: calculating a total system capacity corresponding to the $m^{th}$ directional direction in the S directional directions according to a formula $$C_m = \sum_{j=1}^{J} \max_{k=1,2\ldots K} \log_2(1+G_k^d(m,n_k^*)_j),$$

where $1 \leq m \leq S$, J represents a total quantity of sub-channels, d represents directional, j represents a serial number of a sub-channel, $n_k^*$ represents a directional direction with best channel quality of the $k^{th}$ UE, $C_m$ represents the total system capacity corresponding to the $m^{th}$ directional direction, $\log_2(1+G_k^d(m,n_k^*)_j)$ represents a channel capacity that is of the $j^{th}$ sub-channel and corresponding to the $k^{th}$ UE when the $k^{th}$ UE uses the $n_k^*$ directional direction and the base station uses the $m^{th}$ directional direction, $G_k^d(m,n_k^*)$ represents channel quality that is of the $j^{th}$ sub-channel and corresponding to the $k^{th}$ UE when the $k^{th}$ UE uses the $n_k^*$ directional direction and the base station uses the $m^{th}$ directional direction, and $$\max_{k=1,2\ldots K} \log_2\bigl(1 + G_k(m, n_k^*)_j\bigr)$$

represents a maximum channel capacity that is of the $j^{th}$ sub-channel and obtained when the base station uses the $m^{th}$ directional direction.

With reference to the third possible implementation manner of the second aspect, in a fourth possible implementation manner, the allocating a sub-channel to each UE includes: comparing channel capacities of the $j^{th}$ sub-channel that are corresponding to the UEs when the base station uses the $m_{opt}*$ directional direction and the UEs use directional directions with best channel quality; and allocating the $j^{th}$ sub-channel to UE corresponding to a maximum channel capacity value.

With reference to the first possible implementation manner of the second aspect, in a fifth possible implementation manner, after the determining an optimal directional direction and before the allocating a sub-channel to each UE, the method further includes: sending, by the base station, $L_1$ groups of pilots by using the $m_{opt}$ directional direction, where the $L_1$ groups of pilots are received by the UE by using $L_1$ directional directions, the $L_1$ directional directions are in a one-to-one correspondence with the $L_1$ groups of pilots, the $L_1$ groups of pilots are used by the UE to estimate channel quality corresponding to each directional direction in the $L_1$ directional directions and switch to a directional direction with best channel quality in the $L_1$ directional directions, and $1 \leq L_1 \leq N$.

With reference to the fifth possible implementation manner of the second aspect, in a sixth possible implementation manner, after the sending $L_1$ groups of pilots, the method further includes: receiving, by the base station, channel quality that is of each sub-channel, fed back by each UE, and corresponding to the directional direction with the best channel quality in the $L_1$ directional directions.

With reference to the third possible implementation manner of the second aspect, in a seventh possible implementation manner, the allocating a sub-channel to each UE includes: comparing channel capacities of the $j^{th}$ sub-channel that are corresponding to the UEs when the UEs use the directional directions with best channel quality in the $L_1$ directional direction; and allocating the $j^{th}$ sub-channel to UE corresponding to a maximum channel capacity value.

According to a third aspect of the embodiments of the present invention, a directional direction selection method is provided, including:

receiving, by user equipment UE, L groups of pilots by using L directional directions, where the L groups of pilots are sent by a base station in an omnidirectional direction manner, the L directional directions are in a one-to-one correspondence with the L groups of pilots, L is less than or equal to N, and N is a quantity of reconfigurable directional directions supported by the UE;

estimating, by the UE by using the L groups of pilots, channel quality corresponding to each directional direction in the L directional directions;

switching, by the UE, to a directional direction with best channel quality in the L directional directions;

receiving, by the UE by using the directional direction with the best channel quality in the L directional directions, S groups of pilots that are sent by the base station by using S directional directions, where the S groups of pilots are in a one-to-one correspondence with the S directional directions, $1 \leq S \leq M$, and M is a quantity of reconfigurable directional directions supported by the base station;

estimating, by the UE by using the S groups of pilots, channel quality corresponding to the S directional directions; and feeding back, by the UE, channel quality information or a directional direction with best channel quality in the S directional directions to the base station, so that the base station determines an optimal directional direction in the S directional directions, where the channel quality information includes the channel quality corresponding to the S directional directions, or the directional direction with the best channel quality in the S directional directions and channel quality corresponding to the directional direction with the best channel quality in the S directional directions.

With reference to the third aspect, in a first possible implementation manner, the method further includes: receiving, by the UE, $L_1$ groups of pilots by using $L_1$ directional directions, where the $L_1$ groups of pilots are sent by the base station by using the optimal directional direction, the $L_1$ directional directions are in a one-to-one correspondence with the $L_1$ groups of pilots, and $L_1$ is less than or equal to N; estimating, by the UE, channel quality corresponding to each directional direction in the $L_1$ directional directions; switching, by the UE, to a directional direction with best channel quality in the $L_1$ directional directions, where the directional direction with the best channel quality is represented as an $n_{opt}*$ directional direction; and feeding back, by the UE, channel quality that is of each sub-channel and corresponding to the $n_{opt}*$ directional direction.

According to a fourth aspect of the embodiments of the present invention, a directional direction selection method is provided, including: receiving, by user equipment UE, L groups of pilots by using L directional directions, where the L groups of pilots are sent by a base station in an omnidirectional direction manner, the L directional directions are in a one-to-one correspondence with the L groups of pilots, L is less than or equal to N, and N is a quantity of reconfigurable directional directions supported by the UE;

estimating, by the UE by using the L groups of pilots, channel quality corresponding to each directional direction in the L directional directions;

switching, by the UE, to a directional direction with best channel quality in the L directional directions; and sending, by the UE, S groups of pilots by using the directional direction with the best channel quality in the L directional directions, where the S groups of pilots are received by the base station by using S directional directions, the S groups of pilots are in a one-to-one correspondence with the S directional directions, $1 \leq S \leq M$, M is a quantity of reconfigurable directional directions supported by the base station, and the S groups of pilots are used by the base station to estimate channel quality corresponding to the S directional directions, and the channel quality is used to determine an optimal directional direction in the S directional directions.

With reference to the fourth aspect, in a first possible implementation manner, the method further includes: receiving, by the UE, $L_1$ groups of pilots by using $L_1$ directional directions, where the $L_1$ groups of pilots are sent by the base station by using the optimal directional direction, the $L_1$ directional directions are in a one-to-one correspondence with the $L_1$ groups of pilots, and $1 \leq L_1 \leq N$; estimating, by the UE, channel quality corresponding to each directional direction in the $L_1$ directional directions; switching, by the UE, to a directional direction with best channel quality in the $L_1$ directional directions, where the directional direction with the best channel quality is represented as an $n_{opt}^*$ directional direction; and feeding back, by the UE, channel quality that is of each sub-channel and corresponding to the $n_{opt}^*$ directional direction.

According to a fifth aspect of the embodiments of the present invention, a directional direction selection apparatus is provided, including:

an omnidirectional control unit, configured to control a pattern reconfigurable antenna to send L groups of pilots in an omnidirectional direction manner, where the L groups of pilots are received by UE by using L directional directions, the L directional directions are in a one-to-one correspondence with the L groups of pilots, the L groups of pilots are used by the UE to estimate channel quality corresponding to each directional direction in the L directional directions and switch to a directional direction with best channel quality in the L directional directions, L is less than or equal to N, and N is a quantity of reconfigurable directional directions supported by the UE;

a first directional sending control unit, configured to control the pattern reconfigurable antenna to send S groups of pilots by using S directional directions respectively, where the S groups of pilots are received by the UE by using the directional direction with the best channel quality in the L directional directions, the S groups of pilots are in a one-to-one correspondence with the S directional directions, $1 \leq S \leq M$, M is a quantity of reconfigurable directional directions supported by the base station, and the S groups of pilots are used by the UE to estimate channel quality corresponding to the S directional directions;

an optimal directional direction determining unit, configured to determine an optimal directional direction in the S directional directions according to the channel quality corresponding to the S groups of pilots, where the optimal directional direction in the S directional directions is represented as an $m_{opt}$ directional direction; and a switching unit, configured to control the pattern reconfigurable antenna to switch to the optimal directional direction in the S directional directions.

With reference to the fifth aspect, in a first possible implementation manner, in the aspect of determining an optimal directional direction in the S directional directions according to the channel quality corresponding to the S groups of pilots, the optimal directional direction determining unit is specifically configured to:

receive channel quality information fed back by the UE; and determine the optimal directional direction in the S directional directions according to the channel quality information, where the optimal directional direction is represented as the $m_{opt}$ directional direction, and the channel quality information includes the channel quality corresponding to the S directional directions, or a directional direction with best channel quality in the S directional directions and channel quality corresponding to the directional direction with the best channel quality in the S directional directions.

With reference to the fifth aspect, in a second possible implementation manner, in the aspect of determining an optimal directional direction in the S directional directions according to the channel quality corresponding to the S groups of pilots, the optimal directional direction determining unit is specifically configured to:

receive a directional direction with best channel quality in the S directional directions that is fed back by the UE; and determine the optimal directional direction in the S directional directions according to the directional direction with the best channel quality, where the optimal directional direction is represented as the $m_{opt}$ directional direction.

With reference to the first possible implementation manner of the fifth aspect, in a third possible implementation manner, the apparatus further includes: an allocating unit, configured to allocate a sub-channel to each UE.

With reference to the third possible implementation manner of the fifth aspect, in a fourth possible implementation manner, in the aspect of determining the optimal directional direction in the S directional directions, the optimal directional direction determining unit is specifically configured to: calculate, according to the channel quality information, a total system capacity corresponding to each directional direction in the S directional directions; and determine a directional direction corresponding to a maximum value of the total system capacities as the optimal directional direction.

With reference to the fourth possible implementation manner of the fifth aspect, in a fifth possible implementation manner, in the aspect of calculating, according to the channel quality information, a total system capacity corresponding to each directional direction in the S directional directions, the optimal directional direction determining unit is specifically configured to:

calculate a total system capacity corresponding to the $m^{th}$ directional direction in the S directional directions according to a formula $$C_m = \sum_{j=1}^{J} \max_{k=1,2...K} \log_2(1 + G_k^d(m, n_k^*)_j),$$

where $1 \leq m \leq S$, and

J represents a total quantity of sub-channels, d represents directional, j represents a serial number of a sub-channel, $n_k^*$ represents a directional direction with best channel quality of the $k^{th}$ UE, $C_m$ represents the total system capacity corresponding to the $m^{th}$ directional direction, $\log_2(1+G_k^d(m,n_k^*)_j)$ represents a channel capacity that is of the $j^{th}$ sub-channel and corresponding to the $k^{th}$ UE when the $k^{th}$ UE uses the $n_k^*$ directional direction and the base station uses the $m^{th}$ directional direction, $G_k^d(m,n_k^*)_j$ represents channel quality that is of the $j^{th}$ sub-channel and corresponding to the $k^{th}$ UE when the $k^{th}$ UE uses the $n_k^*$ directional direction and the base station uses the $m^{th}$ directional direction, and $$\max_{k=1,2...K} \log_2(1 + G_k(m, n_k^*)_j)$$

represents a maximum channel capacity that is of the $j^{th}$ sub-channel and obtained when the base station uses the $m^{th}$ directional direction.

With reference to the fifth possible implementation manner of the fifth aspect, in a sixth possible implementation manner, in the aspect of allocating a sub-channel to each UE, the allocating unit is specifically configured to: compare channel capacities of the $j^{th}$ sub-channel that are corresponding to the UEs when the base station uses the $m_{opt}$ directional direction and the UEs use directional directions with best channel quality; and allocate the $j^{th}$ sub-channel to UE corresponding to a maximum channel capacity value.

With reference to the third possible implementation manner of the fifth aspect, in a seventh possible implementation manner, the apparatus further includes:

a second directional sending control unit, configured to control the pattern reconfigurable antenna to send $L_1$ groups of pilots by using the $m_{opt}$ directional direction after the optimal directional direction determining unit determines the optimal directional direction and before the allocating unit allocates the sub-channel to each UE, where the $L_1$ groups of pilots are received by the UE by using $L_1$ directional directions, the $L_1$ directional directions are in a one-to-one correspondence with the $L_1$ groups of pilots, and the $L_1$ groups of pilots are used by the UE to estimate channel quality corresponding to each directional direction in the $L_1$ directional directions and switch to a directional direction with best channel quality in the $L_1$ directional directions, and $1 \leq L_1 \leq N$.

With reference to the seventh possible implementation manner of the fifth aspect, in an eighth possible implementation manner, the apparatus further includes:

a receiving unit, configured to: after the $L_1$ groups of pilots are sent, control the pattern reconfigurable antenna to receive channel quality that is of each sub-channel, fed back by each UE, and corresponding to the directional direction with the best channel quality in the $L_1$ directional directions.

With reference to the eighth possible implementation manner of the fifth aspect, in a ninth possible implementation manner, in the aspect of allocating a sub-channel to each UE, the allocating unit is specifically configured to:

compare channel capacities of the $j^{th}$ sub-channel that are corresponding to the UEs when the UEs use the directional directions with the best channel quality in the $L_1$ directional directions; and allocate the $j^{th}$ sub-channel to UE corresponding to a maximum channel capacity value.

According to a sixth aspect of the embodiments of the present invention, a directional direction selection apparatus is provided, including:

an omnidirectional control unit, configured to control a pattern reconfigurable antenna to send L groups of pilots in an omnidirectional direction manner, where the L groups of pilots are received by UE by using L directional directions, the L directional directions are in a one-to-one correspondence with the L groups of pilots, the L groups of pilots are used by the UE to estimate channel quality corresponding to each directional direction in the L directional directions and switch to a directional direction with best channel quality in the L directional directions, L is less than or equal to N, and N is a quantity of reconfigurable directional directions supported by the UE;

a directional receiving control unit, configured to control the pattern reconfigurable antenna to receive S groups of pilots by using S directional directions respectively, where the S groups of pilots are sent by the UE by using the directional direction with the best channel quality in the L directional directions, the S groups of pilots are in a one-to-one correspondence with the S directional directions, $1 \leq S \leq M$, and M is a quantity of reconfigurable directional directions supported by the base station;

a channel estimation unit, configured to perform, by using the S groups of pilots, channel estimation to obtain channel quality information, where the channel quality information includes channel quality corresponding to each directional direction in the S directional directions;

an optimal directional direction determining unit, configured to determine an optimal directional direction in the S directional directions according to the channel quality information, where the optimal directional direction is represented as an $m_{opt}$ directional direction; and a switching unit, configured to control the pattern reconfigurable antenna to switch to the optimal directional direction in the S directional directions.

With reference to the sixth aspect, in a first possible implementation manner, the apparatus further includes: an allocating unit, configured to allocate a sub-channel to each UE.

With reference to the first possible implementation manner of the sixth aspect, in a second possible implementation manner, in the aspect of determining an optimal directional direction in the S directional directions, the optimal directional direction determining unit is specifically configured to: calculate, according to the channel quality information, a total system capacity corresponding to each directional direction in the S directional directions; and determine a directional direction corresponding to a maximum value of the total system capacities as the optimal directional direction.

With reference to the second possible implementation manner of the sixth aspect, in a third possible implementation manner, in the aspect of calculating, according to the channel quality information, a total system capacity corresponding to each directional direction in the S directional directions, the optimal directional direction determining unit is specifically configured to: calculate a total system capacity corresponding to the $m^{th}$ directional direction in the S directional directions according to a formula $$C_m = \sum_{j=1}^{J} \max_{k=1,2...K} \log_2(1 + G_k^d(m, n_k^*)_j),$$

where J represents a total quantity of sub-channels, d represents directional, j represents a serial number of a sub-channel, $n_k^*$ represents a directional direction with best channel quality of the $k^{th}$ UE, $C_m$ represents the total system capacity corresponding to the $m^{th}$ directional direction, $\log_2(1+G_k^d(m,n_k^*)_j)$ represents a channel capacity that is of the $j^{th}$ sub-channel and corresponding to the $k^{th}$ UE when the $k^{th}$ UE uses the $n_k^*$ directional direction and the base station uses the $m^{th}$ directional direction, $G_k^d(m,n_k^*)$ represents channel quality that is of the $j^{th}$ sub-channel and corresponding to the $k^{th}$ UE when the $k^{th}$ UE uses the $n_k^*$ directional direction and the base station uses the $m^{th}$ directional direction, and $$\max_{k=1,2...K} \log_2(1 + G_k(m, n_k^*)_j)$$

represents a maximum channel capacity that is of the $j^{th}$ sub-channel and obtained when the base station uses the $m^{th}$ directional direction.

With reference to the third possible implementation manner of the sixth aspect, in a fourth possible implementation manner, in the aspect of allocating a sub-channel to each UE, the allocating unit is specifically configured to: compare channel capacities of the $j^{th}$ sub-channel that are corresponding to the UEs when the base station uses the $m_{opt}$ directional direction and the UEs use directional directions with best channel quality; and allocate the $j^{th}$ sub-channel to UE corresponding to a maximum channel capacity value.

With reference to the second possible implementation manner of the sixth aspect, in a fifth possible implementation manner, the apparatus further includes: a directional sending control unit, configured to control the pattern reconfigurable antenna to send $L_1$ groups of pilots by using the $m_{opt}$ directional direction after the optimal directional direction determining unit determines the optimal directional direction and before the allocating unit allocates the sub-channel to each UE, where the $L_1$ groups of pilots are received by the UE by using $L_1$ directional directions, the $L_1$ directional directions are in a one-to-one correspondence with the $L_1$ groups of pilots, the $L_1$ groups of pilots are used by the UE to estimate channel quality corresponding to each directional direction in the $L_1$ directional directions and switch to a directional direction with best channel quality in the $L_1$ directional directions, and $1 \leq L_1 \leq N$.

With reference to the fifth possible implementation manner of the sixth aspect, in a sixth possible implementation manner, the apparatus further includes: a receiving unit, configured to: after the $L_1$ groups of pilots are sent, control the pattern reconfigurable antenna to receive channel quality that is of each sub-channel, fed back by each UE, and corresponding to the directional direction with the best channel quality in the $L_1$ directional directions.

With reference to the sixth possible implementation manner of the sixth aspect, in a seventh possible implementation manner, in the aspect of allocating a sub-channel to each UE, the allocating unit is specifically configured to: compare channel capacities of the $j^{th}$ sub-channel that are corresponding to the UEs when the UEs use the directional directions with the best channel quality in the $L_1$ directional directions; and allocate the $j^{th}$ sub-channel to UE corresponding to a maximum channel capacity value.

According to a seventh aspect of the embodiments of the present invention, a directional direction selection apparatus is provided, including:

a first directional control receiving unit, configured to control a pattern reconfigurable antenna to receive L groups of pilots by using L directional directions, where the L groups of pilots are sent by a base station in an omnidirectional direction manner, the L directional directions are in a one-to-one correspondence with the L groups of pilots, L is less than or equal to N, and N is a quantity of reconfigurable directional directions supported by user equipment UE;

a first channel estimation unit, configured to estimate, by using the L groups of pilots, channel quality corresponding to each directional direction in the L directional directions;

a first directional direction switching unit, configured to control the pattern reconfigurable antenna to switch to a directional direction with best channel quality in the L directional directions;

a second directional control receiving unit, configured to control the pattern reconfigurable antenna to receive S groups of pilots by using the directional direction with the best channel quality, where the S groups of pilots are in a one-to-one correspondence with the S directional directions, $1 \leq S \leq M$, and M is a quantity of reconfigurable directional directions supported by the base station;

a second channel estimation unit, configured to estimate, by using the S groups of pilots, channel quality corresponding to the S directional directions; and a first feedback unit, configured to feed back channel quality information or a directional direction with best channel quality in the S directional directions to the base station, so that the base station determines an optimal directional direction in the S directional directions, where the channel quality information includes the channel quality corresponding to the S directional directions, or the directional direction with the best channel quality in the S directional directions and channel quality corresponding to the directional direction with the best channel quality in the S directional directions.

With reference to the seventh aspect, in a first possible implementation manner of the seventh aspect, the apparatus further includes: a third directional control receiving unit, configured to control the pattern reconfigurable antenna to receive $L_1$ groups of pilots by using $L_1$ directional directions, where the $L_1$ groups of pilots are sent by the base station by using the optimal directional direction, the $L_1$ directional directions are in a one-to-one correspondence with the $L_1$ groups of pilots, and $L_1$ is less than or equal to N; a third channel estimation unit, configured to estimate channel quality corresponding to each directional direction in the $L_1$ directional directions; a second directional direction switching unit, configured to control the pattern reconfigurable antenna to switch to a directional direction with best channel quality in the $L_1$ directional directions, where the directional direction with the best channel quality is represented as an $n_{opt}^*$ directional direction; and a second feedback unit, configured to feed back channel quality that is of each sub-channel and corresponding to the $n_{opt}^*$ directional direction.

According to an eighth aspect of the embodiments of the present invention, a directional direction selection apparatus is provided, including:

a first transmission unit, configured to control a pattern reconfigurable antenna to receive L groups of pilots by using L directional directions, where the L groups of pilots are sent by a base station in an omnidirectional direction manner, the L directional directions are in a one-to-one correspondence with the L groups of pilots, L is less than or equal to N, and N is a quantity of reconfigurable directional directions supported by user equipment UE;

a first estimation unit, configured to estimate, by using the L groups of pilots, channel quality corresponding to each directional direction in the L directional directions;

a first directional direction switching unit, configured to control the pattern reconfigurable antenna to switch to a directional direction with best channel quality in the L directional directions; and a directional control sending unit, configured to send S groups of pilots by using the directional direction with the best channel quality, where the S groups of pilots are received by the base station by using S directional directions, the S groups of pilots are in a one-to-one correspondence with the S directional directions, the S groups of pilots are used by the base station to estimate channel quality corresponding to the S directional directions, and the channel quality is used to determine an optimal directional direction in the S directional directions.

With reference to the eighth aspect, in a first possible implementation manner of the eighth aspect, the apparatus further includes: a second transmission unit, configured to control the pattern reconfigurable antenna to receive $L_1$ groups of pilots by using $L_1$ directional directions, where the $L_1$ groups of pilots are sent by the base station by using the optimal directional direction, the $L_1$ directional directions are in a one-to-one correspondence with the $L_1$ groups of pilots, and $L_1$ is less than or equal to N; a second estimation unit, configured to estimate channel quality corresponding to each directional direction in the $L_1$ directional directions; a second directional direction switching unit, configured to control the pattern reconfigurable antenna to switch to a directional direction with best channel quality in the $L_1$ directional directions, where the directional direction with the best channel quality is represented as an $n_{opt}^*$ directional direction; and a feedback unit, configured to feed back channel quality that is of each sub-channel and corresponding to the $n_{opt}^*$ directional direction.

According to a ninth aspect of the embodiments of the present invention, a directional direction selection apparatus is provided, including a CPU and a memory, where the CPU executes at least the following steps by running a software program stored in the memory and invoking data stored in the memory:

control a pattern reconfigurable antenna to send L groups of pilots in an omnidirectional direction manner, where the L groups of pilots are received by UE by using L directional directions, the L directional directions are in a one-to-one correspondence with the L groups of pilots, the L groups of pilots are used by the UE to estimate channel quality corresponding to each directional direction in the L directional directions and switch to a directional direction with best channel quality in the L directional directions, L is less than or equal to N, and N is a quantity of reconfigurable directional directions supported by the UE;

control the pattern reconfigurable antenna to send S groups of pilots by using S directional directions respectively, where the S groups of pilots are received by the UE by using the directional direction with the best channel quality in the L directional directions, the S groups of pilots are in a one-to-one correspondence with the S directional directions, $1 \leq S \leq M$, M is a quantity of reconfigurable directional directions supported by the base station, and the S groups of pilots are used by the UE to estimate channel quality corresponding to the S directional directions;

determine an optimal directional direction in the S directional directions according to the channel quality corresponding to the S groups of pilots, where the optimal directional direction in the S directional directions is represented as an $m_{opt}$ directional direction; and control the pattern reconfigurable antenna to switch to the optimal directional direction in the S directional directions.

With reference to the ninth aspect, in a first possible implementation manner of the ninth aspect, the CPU further executes the following step by running the software program stored in the memory and invoking the data stored in the memory: allocate a sub-channel to each UE.

With reference to the first possible implementation manner of the ninth aspect, in a second possible implementation manner of the ninth aspect, after determining the optimal directional direction and before allocating the sub-channel to each UE, the CPU further executes the following step by running the software program stored in the memory and invoking the data stored in the memory: control the pattern reconfigurable antenna to send $L_1$ groups of pilots by using the $m_{opt}$ directional direction, where the $L_1$ groups of pilots are received by the UE by using $L_1$ directional directions, the $L_1$ directional directions are in a one-to-one correspondence with the $L_1$ groups of pilots, $1 \leq L_1 \leq N$, and the $L_1$ groups of pilots are used by the UE to estimate channel quality corresponding to each directional direction in the $L_1$ directional directions and switch to a directional direction with best channel quality in the $L_1$ directional directions.

With reference to the second possible implementation manner of the ninth aspect, in a third possible implementation manner of the ninth aspect, after sending the $L_1$ groups of pilots, the CPU further executes the following step by running the software program stored in the memory and invoking the data stored in the memory: control the pattern reconfigurable antenna to receive channel quality that is of each sub-channel, fed back by each UE, and corresponding to the directional direction with the best channel quality in the $L_1$ directional directions.

According to a tenth aspect of the embodiments of the present invention, a directional direction selection apparatus is provided, including a CPU and a memory, where the CPU executes at least the following steps by running a software program stored in the memory and invoking data stored in the memory:

control a pattern reconfigurable antenna to send L groups of pilots in an omnidirectional direction manner, where the L groups of pilots are received by UE by using L directional directions, the L directional directions are in a one-to-one correspondence with the L groups of pilots, the L groups of pilots are used by the UE to estimate channel quality corresponding to each directional direction in the L directional directions and switch to a directional direction with best channel quality in the L directional directions, L is less than or equal to N, and N is a quantity of reconfigurable directional directions supported by the UE;

control the pattern reconfigurable antenna to receive S groups of pilots by using S directional directions respectively, where the S groups of pilots are sent by the UE by using the directional direction with the best channel quality in the L directional directions, the S groups of pilots are in a one-to-one correspondence with the S directional directions, $1 \leq S \leq M$, and M is a quantity of reconfigurable directional directions supported by the base station;

perform, by using the S groups of pilots, channel estimation to obtain channel quality corresponding to each directional direction in the S directional directions;

determine an optimal directional direction in the S directional directions according to the channel quality information, where the optimal directional direction in the S directional directions is represented as an $m_{opt}$ directional direction; and control the pattern reconfigurable antenna to switch to the optimal directional direction in the S directional directions.

With reference to the tenth aspect, in a first possible implementation manner of the tenth aspect, the CPU further executes the following step by running the software program stored in the memory and invoking the data stored in the memory: allocate a sub-channel to each UE.

With reference to the first possible implementation manner of the tenth aspect, in a second possible implementation manner of the tenth aspect, after determining the optimal directional direction and before allocating the sub-channel to each UE, the CPU further executes the following step by running the software program stored in the memory and invoking the data stored in the memory: control the pattern reconfigurable antenna to send $L_1$ groups of pilots by using the $m_{opt}$ directional direction, where the $L_1$ groups of pilots are received by the UE by using $L_1$ directional directions, the $L_1$ directional directions are in a one-to-one correspondence with the $L_1$ groups of pilots, $1 \leq L_1 \leq N$, and the $L_1$ groups of pilots are used by the UE to estimate channel quality corresponding to each directional direction in the $L_1$ directional directions and switch to a directional direction with best channel quality in the $L_1$ directional directions.

With reference to the second possible implementation manner of the tenth aspect, in a third possible implementation manner of the tenth aspect, after sending the $L_1$ groups of pilots, the CPU further executes the following step by running the software program stored in the memory and invoking the data stored in the memory: control the pattern reconfigurable antenna to receive channel quality that is of each sub-channel, fed back by each UE, and corresponding to the directional direction with the best channel quality in the $L_1$ directional directions.

According to an eleventh aspect of the embodiments of the present invention, a directional direction selection apparatus is provided, including a CPU and a memory, where the CPU executes at least the following steps by running a software program stored in the memory and invoking data stored in the memory:

control a pattern reconfigurable antenna to receive L groups of pilots by using L directional directions, where the L groups of pilots are sent by a base station in an omnidirectional direction manner, the L directional directions are in a one-to-one correspondence with the L groups of pilots, L is less than or equal to N, and N is a quantity of reconfigurable directional directions supported by user equipment UE;

estimate, by using the L groups of pilots, channel quality corresponding to each directional direction in the L directional directions;

control the pattern reconfigurable antenna to switch to a directional direction with best channel quality in the L directional directions;

control the pattern reconfigurable antenna to receive, by using the directional direction with the best channel quality, S groups of pilots that are sent by the base station by using S directional directions, where the S groups of pilots are in a one-to-one correspondence with the S directional directions, $1 \leq S \leq M$, and M is a quantity of reconfigurable directional directions supported by the base station;

estimate, by using the S groups of pilots, channel quality corresponding to the S directional directions; and feedback channel quality information or a directional direction with best channel quality in the S directional directions, so that the base station determines an optimal directional direction in the S directional directions, where the channel quality information includes the channel quality corresponding to the S directional directions, or the directional direction with the best channel quality in the S directional directions and channel quality corresponding to the directional direction with the best channel quality in the S directional directions.

With reference to the eleventh aspect, in a first possible implementation manner of the eleventh aspect, the CPU further executes the following steps by running the software program stored in the memory and invoking the data stored in the memory: control the pattern reconfigurable antenna to receive $L_1$ groups of pilots by using $L_1$ directional directions, where the $L_1$ groups of pilots are sent by the base station by using the optimal directional direction, the $L_1$ directional directions are in a one-to-one correspondence with the $L_1$ groups of pilots, and $1 \leq L_1 \leq N$; estimate channel quality corresponding to each directional direction in the $L_1$ directional directions; control the pattern reconfigurable antenna to switch to a directional direction with best channel quality in the $L_1$ directional directions, where the directional direction with the best channel quality is represented as an $n_{opt}$* directional direction; and feed back channel quality that is of each sub-channel and corresponding to the $n_{opt}$* directional direction.

According to a twelfth aspect of the embodiments of the present invention, a directional direction selection apparatus is provided, including a CPU and a memory, where the CPU executes at least the following steps by running a software program stored in the memory and invoking data stored in the memory:

control a pattern reconfigurable antenna to receive L groups of pilots by using L directional directions, where the L groups of pilots are sent by a base station in an omnidirectional direction manner, the L directional directions are in a one-to-one correspondence with the L groups of pilots, L is less than or equal to N, and N is a quantity of reconfigurable directional directions supported by user equipment UE;

estimate, by using the L groups of pilots, channel quality corresponding to each directional direction in the L directional directions;

control the pattern reconfigurable antenna to switch to a directional direction with best channel quality in the L directional directions; and control the pattern reconfigurable antenna to send S groups of pilots by using the directional direction with the best channel quality in the L directional directions, where the S groups of pilots are received by the base station by using S directional directions, the S groups of pilots are in a one-to-one correspondence with the S directional directions, $1 \leq S \leq M$, M is a quantity of reconfigurable directional directions supported by the base station, and the S groups of pilots are used by the base station to estimate channel quality corresponding to the S directional directions, and the channel quality is used to determine an optimal directional direction in the S directional directions.

With reference to the twelfth aspect, in a first possible implementation manner of the twelfth aspect, the CPU further executes the following steps by running the software program stored in the memory and invoking the data stored in the memory: control the pattern reconfigurable antenna to receive $L_1$ groups of pilots by using $L_1$ directional directions, where the $L_1$ groups of pilots are sent by the base station by using the optimal directional direction, the $L_1$ directional directions are in a one-to-one correspondence with the $L_1$ groups of pilots, and $1 \leq L_1 \leq N$; estimate channel quality corresponding to each directional direction in the $L_1$ directional directions; control the pattern reconfigurable antenna to switch to a directional direction with best channel quality in the $L_1$ directional directions, where the directional direction with the best channel quality is represented as an $n_{opt}$* directional direction; and feed back channel quality that is of each sub-channel and corresponding to the $n_{opt}$* directional direction.

According to a thirteenth aspect of the embodiments of the present invention, a directional direction selection system is provided, including a reconfigurable antenna and the directional direction selection apparatus described in any one of the ninth aspect to the third possible implementation manner of the tenth aspect.

According to a fourteenth aspect of the embodiments of the present invention, a directional direction selection system is provided, including a reconfigurable antenna and the directional direction selection apparatus described in any one of the eleventh aspect to the first possible implementation manner of the twelfth aspect.

In the embodiments of the present invention, it may be seen that an optimal directional direction (a directional direction with best channel quality) corresponding to UE when a base station uses omnidirectional directions is first determined, and then an optimal directional direction corresponding to the base station when the UE uses the foregoing optimal directional direction is determined. The optimal directional direction of the UE and the optimal directional direction of the base station are separately determined. Therefore, a combination manner of directional directions of the base station and directional directions of the UE is accordingly determined, thereby reducing complexity to O(L+S). L is less than or equal to N, and S is less than or equal to M. Therefore, complexity in this embodiment of the present invention is O(M+N) at most. Compared with O(M× N) in an exhaustive attack method, the complexity is reduced.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
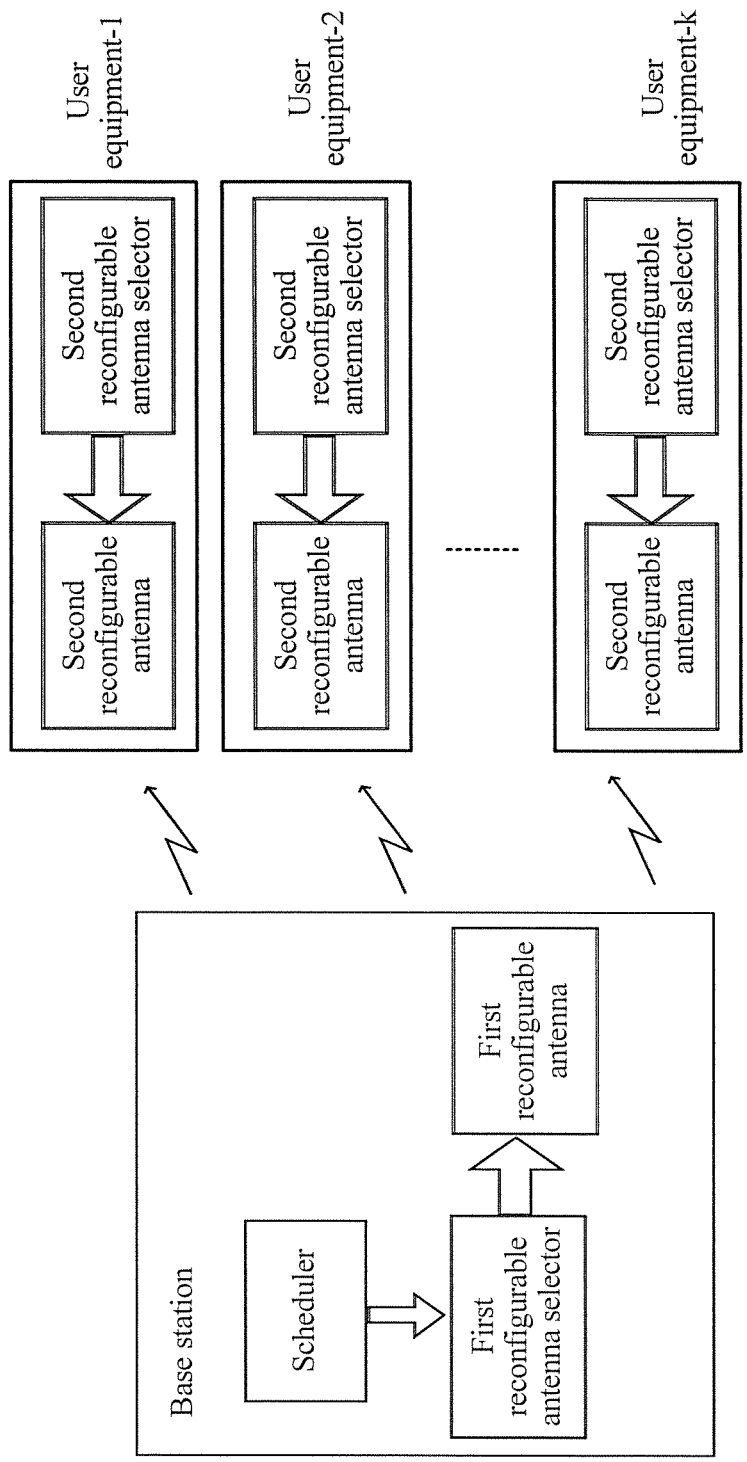
FIG. 1 is a schematic diagram of a communications system according to an embodiment of the present invention.

A schematic diagram of a communications system to which a pattern reconfigurable antenna is applied is shown in FIG. 1.

In FIG. 1, a pattern reconfigurable antenna is configured on both a base station and user equipment (UE). For differentiation, the pattern reconfigurable antenna used by the base station is referred to as a first pattern reconfigurable antenna, and the pattern reconfigurable antenna on the UE is referred to as a second pattern reconfigurable antenna, where the first and the second are merely for differentiation. Likewise, for a first reconfigurable antenna selector and a second reconfigurable antenna selector in the following, the first and the second are merely for differentiation.

The first pattern reconfigurable antenna and the second reconfigurable antenna may change original current distribution in an antenna unit by adjusting a switch apparatus, such as a MESFET (metal semiconductor effect transistor), a PIN switch, an MEMS (micro-electronic mechanism) switch, or a variable capacitance diode, in the antenna unit, so as to change a directivity pattern of the antenna unit.

A scheduler of the base station controls a direction of the first pattern reconfigurable antenna by using the first reconfigurable antenna selector. The first pattern reconfigurable antenna can support omnidirectional directions and M different directional directions.

The second reconfigurable antenna selector of the UE controls a direction of the second pattern reconfigurable antenna. The second pattern reconfigurable antenna can support N different directional directions.

If the pattern reconfigurable antenna is configured on both the base station and the UE, in a downlink transmission scenario, the directional directions of the base station and the directional directions of the UE have M×N combination manners. An optimal combination manner may be determined by using an exhaustive attack method. However, complexity of the exhaustive attack method is O(M×N), where the complexity is relatively high.

To reduce complexity, the embodiments of the present invention provide a directional direction selection method, where mutual cooperation between the base station and the UE is needed to implement the method. The base station may send a notification message to the UE to notify the UE to collaboratively execute, together with the base station, the directional direction selection method provided in the embodiments.

The technical solutions provided in the embodiments of the present invention may be applied to multiple systems or networks, such as a cellular network (an LTE network) and a WiFi network. Correspondingly, the base station mentioned in the embodiments of the present invention may be a base station or relay node in the cellular network, or an access point in the WiFi network.

The base station may communicate with the UE by using a TDD (Time Division Duplexing, time division duplex) mode or by using an FDD (Frequency Division Duplexing, frequency division duplex) mode. In each mode, there may be a single-link/single-user scenario (one base station is corresponding to one UE), a multi-link scenario (multiple base stations are corresponding to multiple UEs), and a multi-user scenario (one base station is corresponding to multiple UEs).

A technical solution in the single-link/single-user scenario is similar to that in the multi-link scenario, and the multi-user scenario may further relate to user scheduling.

This specification separately describes in further detail the technical solutions in a sequence of a single-link/single-user scenario/multi-link scenario in the FDD mode, a single-link/single-user scenario/multi-link scenario in the TDD mode, a multi-user scenario in the FDD mode, and a multi-user scenario in the TDD mode.

Figure 2:
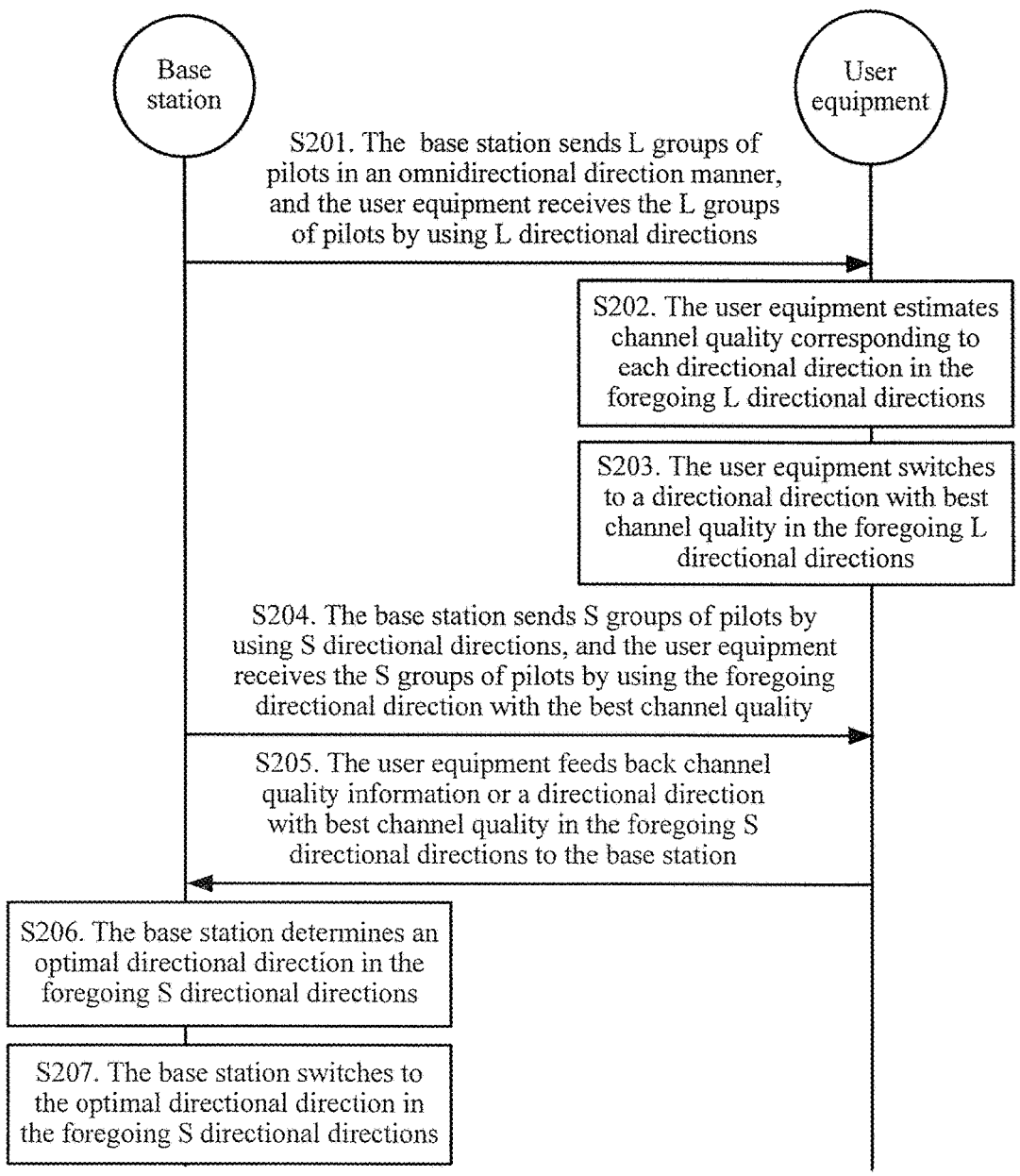
FIG. 2 is a flowchart of interaction between a base station and UE according to an embodiment of the present invention.

The single-link/single-user scenario/multi-link scenario in the FDD mode:

FIG. 2 shows a process of interaction between a base station and UE, where the process may include at least the following steps:

S201. The base station sends L groups of pilots in an omnidirectional direction manner, and the UE receives the L groups of pilots by using L directional directions, where 1≤L≤N, N is a quantity of reconfigurable directional directions supported by a second pattern reconfigurable antenna, and the UE may report N, so that the base station obtains N.

More specifically, a scheduler controls, by using a first reconfigurable antenna selector, a first pattern reconfigurable antenna to send the L groups of pilots in the omnidirectional direction manner. Various groups of pilots are distinguished from each other in terms of time. Pilots that are sent at a same moment are referred to as a group of pilots.

More specifically, a second reconfigurable antenna selector controls the second pattern reconfigurable antenna to receive the foregoing L groups of pilots by using the L directional directions.

The foregoing L directional directions are in a one-to-one correspondence with the foregoing L groups of pilots, that is, the UE switches to a directional direction each time the UE receives a group of pilots.

S202. The UE estimates, by using the foregoing L groups of pilots, (downlink) channel quality corresponding to each directional direction in the foregoing L directional directions.

More specifically, the second reconfigurable antenna selector may estimate the channel quality corresponding to each directional direction in the foregoing L directional directions.

The channel quality may be estimated in an existing estimation manner, and details are not described herein.

S203. The UE switches to a directional direction with best channel quality in the foregoing L directional directions.

More specifically, the second reconfigurable antenna selector controls the foregoing second pattern reconfigurable antenna to switch to the directional direction with the best channel quality in the L directional directions.

S204. The base station sends S groups of pilots by using S directional directions, and the UE receives the S groups of pilots by using the foregoing directional direction with the best channel quality.

1≤S≤M, and M is a quantity of reconfigurable directional directions supported by the base station (the first pattern reconfigurable antenna).

The foregoing S groups of pilots are in a one-to-one correspondence with the foregoing S directional directions. That is, the base station changes a directional direction each time the base station sends a group of pilots.

Alternatively, in another scenario, the UE may send S groups of pilots by using the directional direction with the best channel quality in the foregoing L directional directions, and the base station receives the S groups of pilots by using the S directional directions. A specific description is further provided in the following in this specification.

S205. The user equipment feeds back channel quality information or a directional direction with best channel quality in the foregoing S directional directions to the base station.

The foregoing channel quality information may include channel quality corresponding to the S directional directions, or the foregoing channel quality information may include an index corresponding to the directional direction with the best channel quality in the foregoing S directional directions and channel quality corresponding to the directional direction. A more specific description is provided in the following in this specification.

S206. The base station determines an optimal directional direction in the foregoing S directional directions according to the channel quality corresponding to the foregoing S groups of pilots.

More specifically, the base station may determine the optimal directional direction in the foregoing S directional directions according to the channel quality information fed back by the user equipment or the directional direction with the best channel quality in the foregoing S directional directions that is fed back by the user equipment.

The directional direction with the best channel quality in the foregoing S directional directions is determined according to the channel quality corresponding to the S groups of pilots. Therefore, determining the optimal directional direction in the foregoing S directional directions according to the channel quality information fed back by the user equipment or the directional direction with the best channel quality in the foregoing S directional directions that is fed back by the user equipment may be collectively referred to as "determining the optimal directional direction in the foregoing S directional directions according to the channel quality corresponding to the foregoing S groups of pilots".

For the single-link/single-user scenario/multi-link scenario in the FDD mode, this specification further describes, in the following, two manners of implementing determining of the optimal directional direction.

S207. The base station switches to the optimal directional direction in the foregoing S directional directions.

More specifically, the scheduler controls, by using the first reconfigurable antenna selector, the first pattern reconfigurable antenna to switch to the optimal directional direction in the foregoing S directional directions.

Subsequently, the base station sends downlink data by using the foregoing optimal directional direction.

Figure 3:
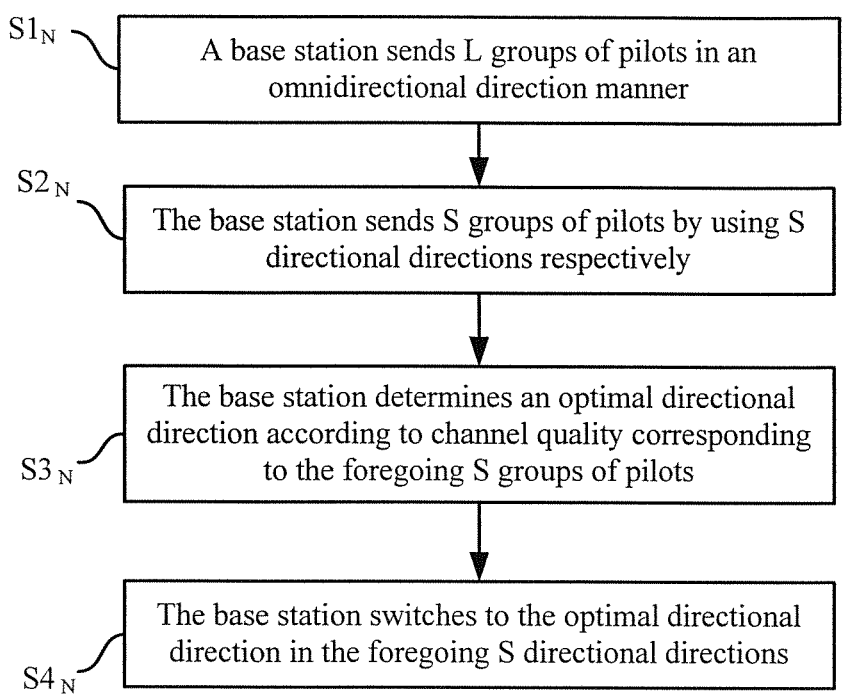
FIG. 3 is a flowchart of a directional direction selection method according to an embodiment of the present invention.

Based on the foregoing interaction process, referring to FIG. 3, steps executed by a base station are as follows:

$S1_N$. The base station sends L groups of pilots in an omnidirectional direction manner, where the subscript N represents the base station.

The foregoing L groups of pilots are received by UE by using L directional directions, and the foregoing L groups of pilots are in a one-to-one correspondence with the L directional directions used by the UE.

The foregoing L groups of pilots are used by the UE to estimate channel quality corresponding to each directional direction in the foregoing L directional directions and switch to a directional direction with best channel quality in the foregoing L directional directions.

It may be learnt from the foregoing records that L is less than or equal to N, and N is a quantity of reconfigurable directional directions supported by the UE.

A specific value of L may be set in multiple manners. One manner of the multiple manners is random selection, that is, randomly selecting a value from 1 to N as the value of L.

Certainly, the value of L may also be set in another manner. For example, because a quantity of pilots sent by the base station in the omnidirectional direction manner is in inverse proportion to a time delay requirement, L may be set to a relatively small value when the time delay requirement is sensitive, or L may be set to a relatively large value when the time delay requirement is insensitive. A person skilled in the art may flexibly design according to a requirement, and details are not described herein.

It should be noted that both the base station and the UE may set the specific value of L. When the UE sets the specific value of L, the UE further needs to feed back the specific value of L to the base station.

$S2_N$. The base station sends S groups of pilots by using S directional directions respectively.

The foregoing S groups of pilots are in a one-to-one correspondence with the S directional directions used by the base station. The foregoing S groups of pilots are received by the UE by using the directional direction with the best channel quality (in the L directional directions).

The foregoing S groups of pilots are used by the UE to estimate channel quality corresponding to the foregoing S directional directions.

It may be learnt from the foregoing records that S is less than or equal to M, and M is a quantity of reconfigurable directional directions supported by the foregoing base station (a first pattern reconfigurable antenna).

The base station may set a specific value of S in multiple manners. One manner of the multiple manners is random selection, that is, randomly selecting a value from 1 to M as the value of S.

Certainly, the value of S may also be set in another manner. For example, S may be set to a relatively small value when a time delay requirement is sensitive, or S may be set to a relatively large value when a time delay requirement is insensitive. A person skilled in the art may flexibly design according to a requirement, and details are not described herein.

$S3_N$. The base station determines an optimal directional direction in the foregoing S directional directions according to channel quality corresponding to the foregoing S groups of pilots.

$S4_N$. The base station switches to the optimal directional direction in the foregoing S directional directions.

In this embodiment of the present invention, it may be seen that an optimal directional direction (a directional direction with best channel quality) corresponding to UE when a base station uses omnidirectional directions is first determined, and then an optimal directional direction corresponding to the base station when the UE uses the foregoing optimal directional direction is determined. The optimal directional direction of the UE and the optimal directional direction of the base station are separately determined. Therefore, a combination manner of directional directions of the base station and directional directions of the UE is accordingly determined, thereby reducing complexity to O(L+S). L is less than or equal to N, and S is less than or equal to M. Therefore, complexity in this embodiment of the present invention is O(M+N) at most. Compared with O(M×N) in an exhaustive attack method, the complexity is reduced.

Figure 4:
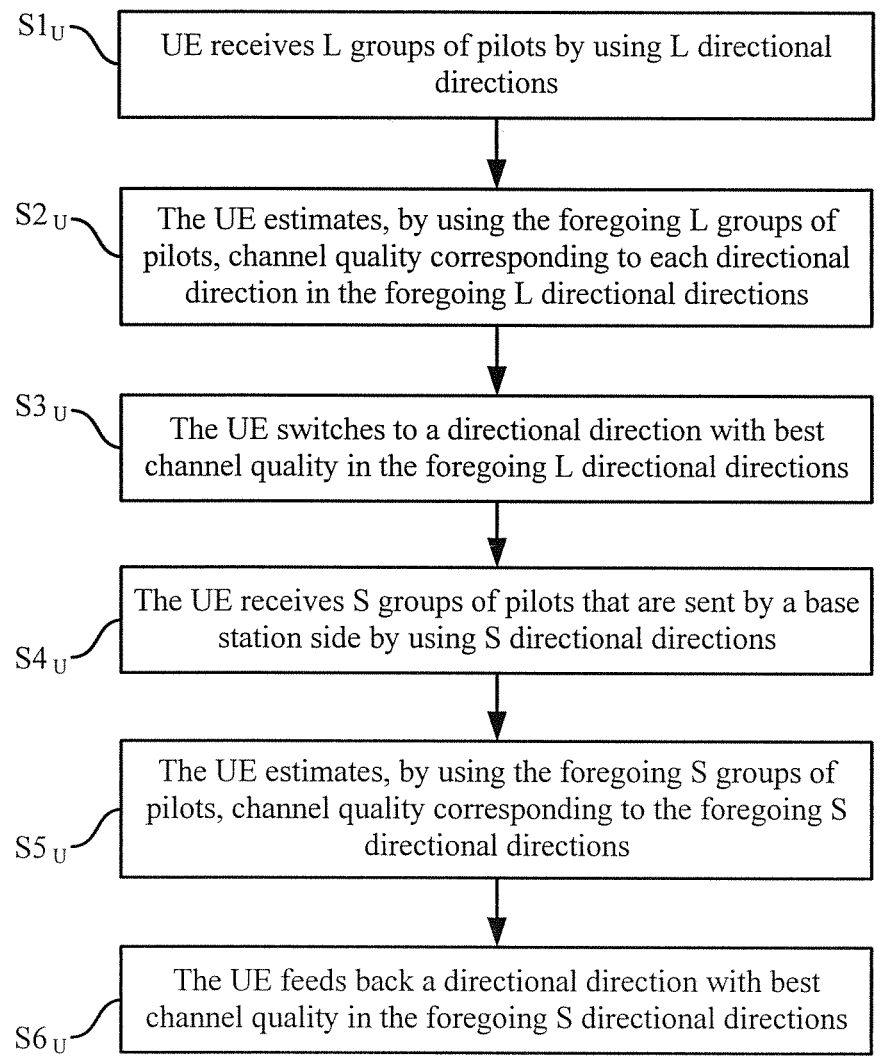
FIG. 4 is another flowchart of a directional direction selection method according to an embodiment of the present invention.

Correspondingly, based on the foregoing interaction process, referring to FIG. 4, steps executed by UE are as follows:

$S1_U$. The UE receives L groups of pilots by using L directional directions, where the subscript U represents the UE.

The foregoing L groups of pilots are sent by a base station in an omnidirectional direction manner, and the foregoing L directional directions are in a one-to-one correspondence with the foregoing L groups of pilots.

$S2_U$. The UE estimates, by using the foregoing L groups of pilots, channel quality corresponding to each directional direction in the foregoing L directional directions.

The foregoing channel quality includes channel quality of each sub-channel. The $n^{th}$ directional direction in the L directional directions is used as an example. Channel quality that is of the $j^{th}$ sub-channel and corresponding to the $n^{th}$ directional direction may be represented as $G^o(n)_j$, j=1 . . . J, where J represents a total quantity of sub-channels, and the superscript o represents that the base station performs transmission by using omnidirectional directions.

When sending each group of pilots, the base station may send the group of pilots by using all sub-channels. Therefore, the UE can obtain channel information of all the sub-channels by means of estimation.

Alternatively, to improve channel utilization efficiency, the base station may send a pilot by using only some of the sub-channels, and the UE may obtain channel information of remaining sub-channels by using interpolation or another channel estimation method.

In an LTE system, one sub-channel is corresponding to one RB (resource block, time-frequency resource), where each RB includes multiple subcarriers. In a WiFi system, one sub-channel is corresponding to one subcarrier.

S3$_U$. The UE switches to a directional direction with best channel quality in the foregoing L directional directions.

The directional direction with the best channel quality in the foregoing L directional directions may be referred to as an $n_O^*$ directional direction.

The directional direction with the best channel quality may be determined in multiple manners. One manner of the multiple manners is using a directional direction corresponding to largest average channel quality of sub-channels as the directional direction with the best channel quality, which is represented by using a formula, that is, $$n_O^* = \underset{n=1,\ldots L}{\mathrm{argmax}} \frac{1}{J} \sum_{j=1}^{J} G^o(n)_j.$$

For example, assuming that L is equal to 3, and J=3, channel quality that is of the sub-channels and corresponding to each directional direction is shown in the following Table 1.

TABLE 1

| Sub-channel | Direction | | |
| --- | --- | --- | --- |
| | 1 | 2 | 3 |
| 1 | 4 | 13 | 8 |
| 2 | 6 | 5 | 2 |
| 3 | 5 | 3 | 2 |
| Average channel quality | 5 | 7 | 4 |

It may be learnt from Table 1 that average channel quality that is of the sub-channels and corresponding to the directional direction 1 is 5, average channel quality that is of the sub-channels and corresponding to the directional direction 2 is 7, and average channel quality that is of the sub-channels and corresponding to the directional direction 3 is 4. Then, the directional direction 2 is used as the directional direction with best channel quality.

Certainly, the directional direction with the best channel quality may also be determined by using another direction. For example, a directional direction corresponding to a smallest variance of channel quality of sub-channels may be used as the directional direction with the best channel quality. A person skilled in the art may flexibly design according to a requirement, and details are not described herein.

S4$_U$. The UE receives, by using the foregoing directional direction with the best channel quality, S groups of pilots that are sent by a base station by using S directional directions.

The foregoing S directional directions are in a one-to-one correspondence with the foregoing S groups of pilots. That is, the UE switches to a directional direction each time the UE receives a group of pilots.

S is less than or equal to M, and is greater than or equal to 1, where M is a quantity of reconfigurable directional directions supported by the foregoing base station.

S5$_U$. The UE estimates, by using the foregoing S groups of pilots, channel quality corresponding to the foregoing S directional directions.

Actually, the UE estimates downlink channel quality corresponding to the S directional directions.

S6$_U$. The UE feeds back a directional direction with best channel quality in the foregoing S directional directions to the foregoing base station.

Figure 5:
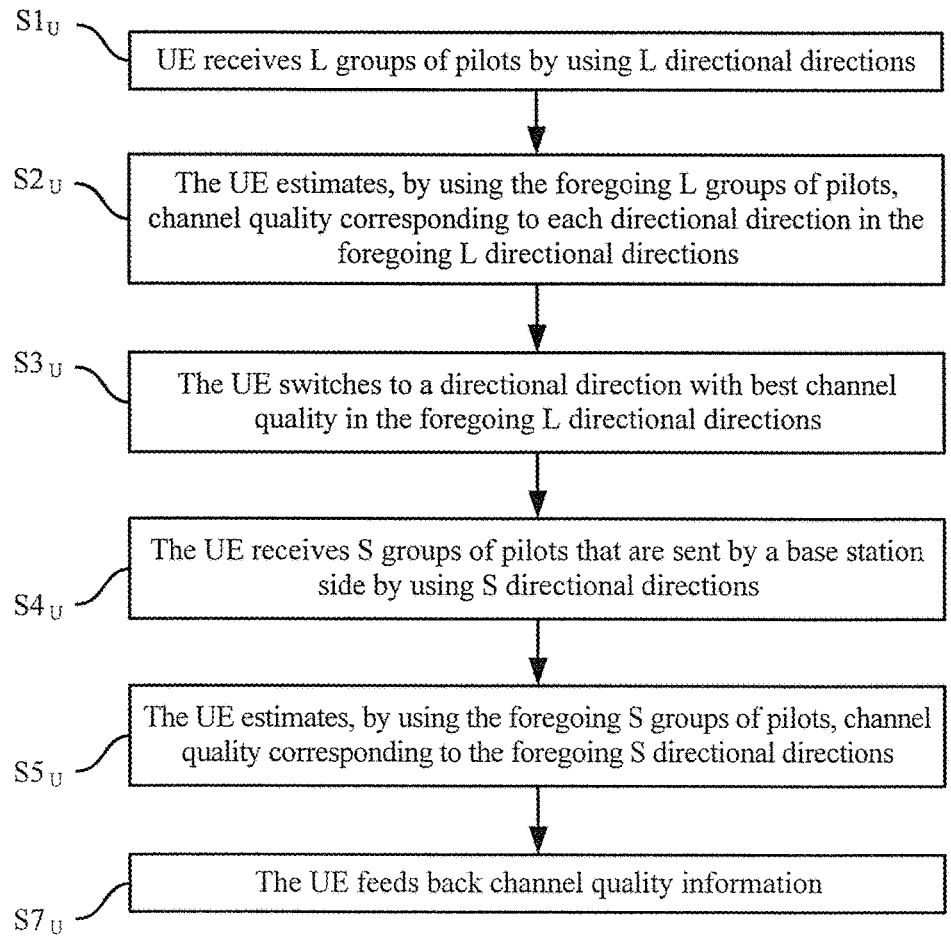
FIG. 5 is still another flowchart of a directional direction selection method according to an embodiment of the present invention.

Alternatively, in another embodiment of the present invention, referring to FIG. 5, after step S5$_U$, steps executed by the UE may further include:

S7$_U$. The UE feeds back channel quality information to the foregoing base station.

In this embodiment, the foregoing channel quality information may include the channel quality corresponding to the foregoing S directional directions.

The UE determines the directional direction with the best channel quality in multiple manners. For example, a directional direction corresponding to largest average channel quality of sub-channels is used as the directional direction with the best channel quality, or a directional direction corresponding to a smallest variance of channel quality of sub-channels is used as the directional direction with the best channel quality. A person skilled in the art may flexibly design according to a requirement, and details are not described herein.

Figure 6:
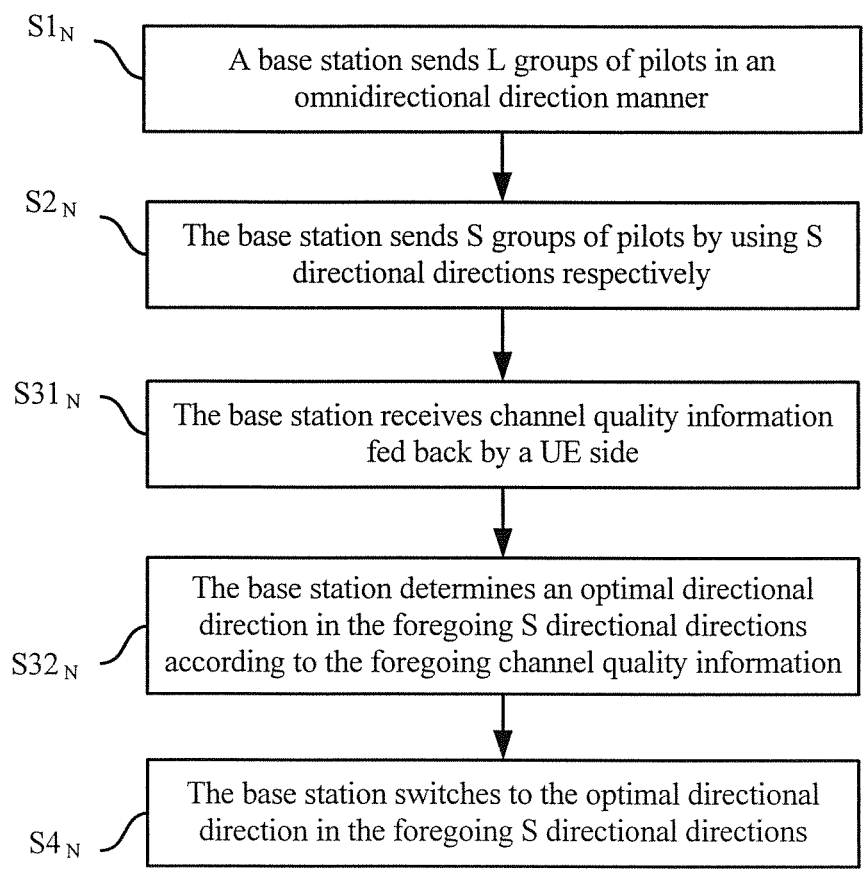
FIG. 6 is still another flowchart of a directional direction selection method according to an embodiment of the present invention.

In another embodiment of the present invention, referring to FIG. 6, in this scenario, step S3$_N$ in all the foregoing embodiments may further include:

S31$_N$. The base station receives channel quality information fed back by UE.

In this embodiment, the foregoing channel quality information may include the channel quality corresponding to the foregoing S directional directions.

S32$_N$. The foregoing base station determines the optimal directional direction in the foregoing S directional directions according to the channel quality corresponding to the foregoing S directional directions, where the optimal directional direction is represented as an $m_{opt}$ directional direction.

The optimal directional direction is determined in multiple manners. One manner of the multiple manners is using a directional direction, in the S directional directions, corresponding to largest average channel quality of sub-channels as the optimal directional direction.

For example, assuming that S is equal to 3, average channel quality that is of sub-channels and corresponding to a directional direction 1 is 5, average channel quality that is of the sub-channels and corresponding to a directional direction 2 is 7, and average channel quality that is of the sub-channels and corresponding to a directional direction 3 is 4. Then, the directional direction 2 is used as a directional direction with best channel quality.

Certainly, the directional direction with the best channel quality may also be determined by using another direction. For example, a directional direction corresponding to a smallest variance of channel quality of sub-channels is used as the optimal directional direction. A person skilled in the art may flexibly design according to a requirement, and details are not described herein.

Figure 7:
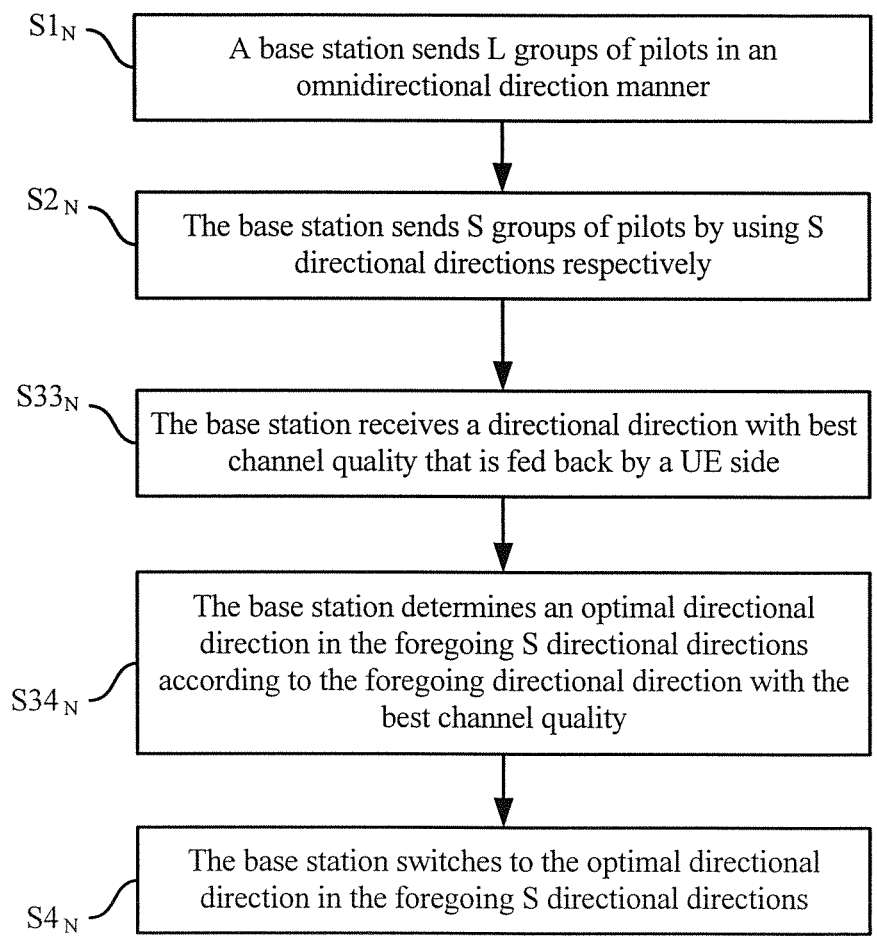
FIG. 7 is still another flowchart of a directional direction selection method according to an embodiment of the present invention.

In another embodiment of the present invention, referring to FIG. 7, in this scenario, step S3$_N$ in all the foregoing embodiments may further include:

S33$_N$. The base station receives a directional direction with best channel quality in the foregoing S directional directions that is fed back by UE.

S34$_N$. The base station determines the optimal directional direction in the foregoing S directional directions according to the foregoing directional direction with the best channel quality, where the optimal directional direction is represented as an $m_{opt}$ directional direction.

More specifically, assuming that the $s^{th}$ directional direction in the S directional directions has best channel quality, the UE feeds back an index number of the $s^{th}$ directional direction, and the base station switches, according to the received index number, to a directional direction corresponding to the index number.

This solution is especially applicable to a single-link or single-user scenario in an FDD mode.

Figure 8:
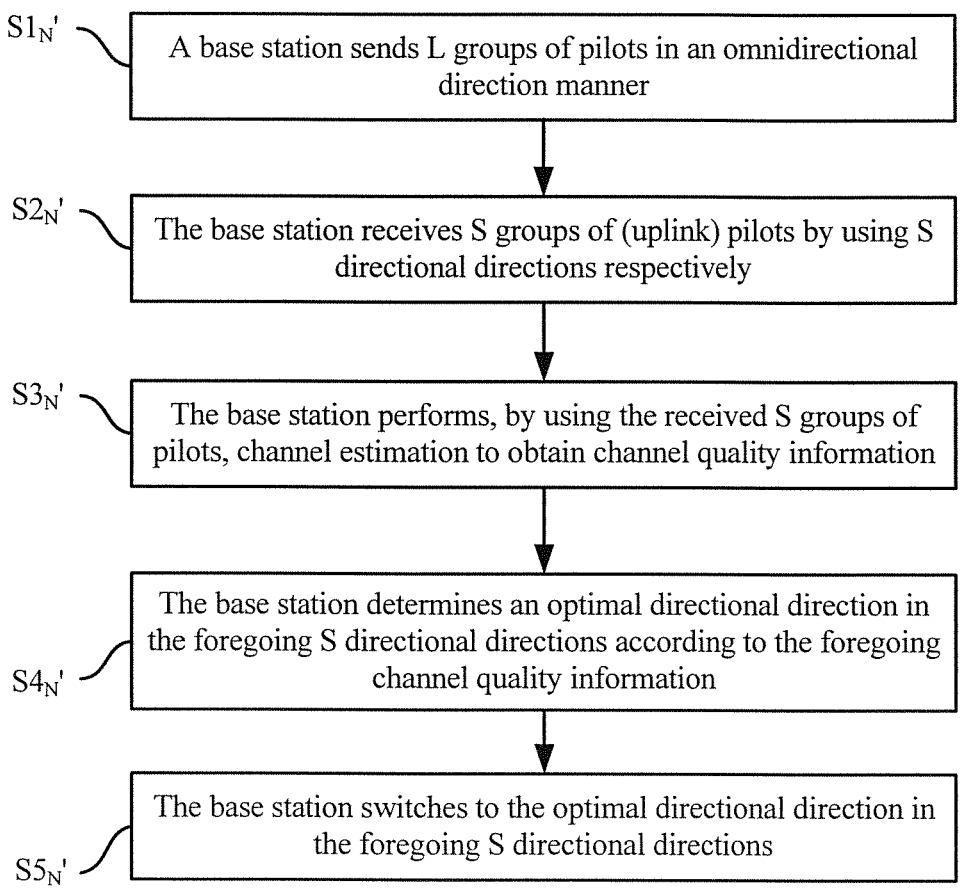
FIG. 8 is still another flowchart of a directional direction selection method according to an embodiment of the present invention.

The single-link/single-user scenario/multi-link scenario in the TDD mode:

In this scenario, referring to FIG. 8, steps executed by a base station are as follows:

S1$_N$. The base station sends L groups of pilots in an omnidirectional direction manner, where the subscript N represents the base station.

For related content, refer to the foregoing records in this specification, and details are not described herein.

S2$_N$. The base station receives S groups of (uplink) pilots by using S directional directions respectively.

The foregoing S groups of pilots are in a one-to-one correspondence with the foregoing S directional directions, that is, the base station switches to a directional direction each time the base station receives a group of pilots.

S3$_N$. The base station performs, by using the received S groups of pilots, channel estimation to obtain channel quality information.

In this embodiment, the foregoing channel quality information includes channel quality corresponding to each directional direction in the foregoing S directional directions.

The foregoing channel quality may include channel quality of each sub-channel. The $m^{th}$ directional direction in the S directional directions is used as an example. Channel quality that is of the $j^{th}$ sub-channel and corresponding to the $m^{th}$ directional direction may be represented as $G^d(m,n_o^*)_j$, $j=1 \ldots J$, where $n_o^*$ represents a directional direction with best channel quality that is used by the UE, and d represents directional.

S4$_N$. The base station determines an optimal directional direction in the foregoing S directional directions according to the foregoing channel quality information, where the optimal directional direction is represented as an $m_{opt}$ directional direction.

The optimal directional direction is determined in multiple manners. One manner of the multiple manners is using a directional direction, in the S directional directions, corresponding to largest average channel quality of sub-channels as the optimal directional direction. A corresponding calculation formula is $$m_{opt} = \underset{m=1,\ldots S}{\operatorname{argmax}} \frac{1}{J} \sum_{j=1}^{J} G^d(m, n_o^*)_j,$$

where m represents a serial number (an index) of a directional direction.

For example, assuming that S is equal to 3, average channel quality that is of sub-channels and corresponding to a directional direction 1 is 5, average channel quality that is of the sub-channels and corresponding to a directional direction 2 is 7, and average channel quality that is of the sub-channels and corresponding to a directional direction 3 is 4. Then, the directional direction 2 is used as a directional direction with best channel quality.

Certainly, the directional direction with the best channel quality may also be determined by using another direction. For example, a directional direction corresponding to a smallest variance of channel quality of sub-channels is used as the optimal directional direction. A person skilled in the art may flexibly design according to a requirement, and details are not described herein.

S5$_N$. The base station switches to the optimal directional direction in the foregoing S directional directions.

Figure 9:
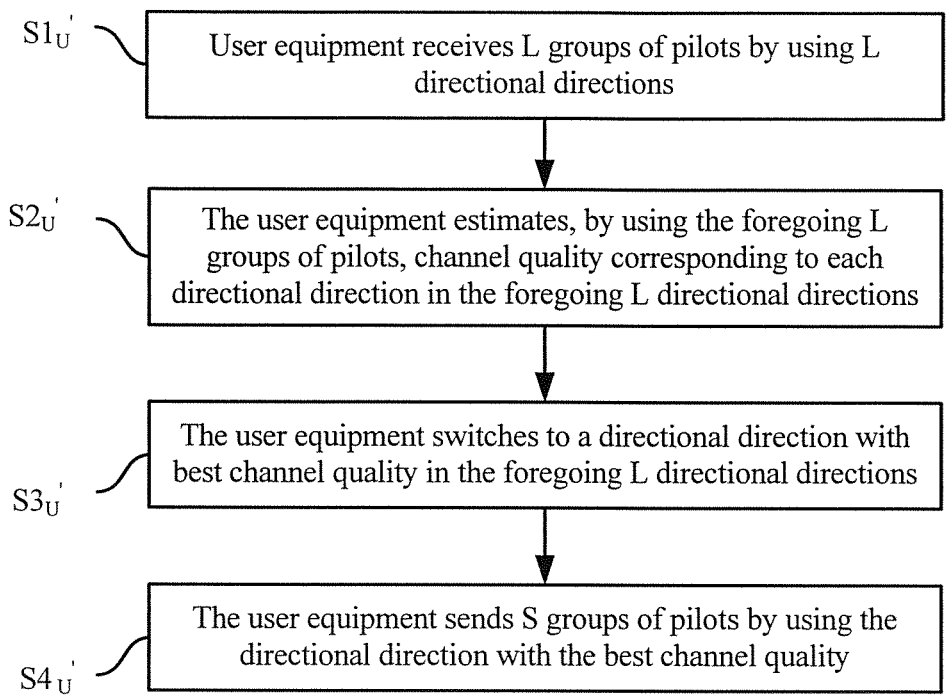
FIG. 9 is still another flowchart of a directional direction selection method according to an embodiment of the present invention.

Correspondingly, referring to FIG. 9, steps executed by UE in all the foregoing embodiments may include:

S1$_U$. The UE receives L groups of pilots by using L directional directions, where the subscript U represents the UE.

For specific content, refer to the foregoing records in this specification, and details are not described herein.

S2$_U$. The UE estimates, by using the foregoing L groups of pilots, channel quality corresponding to each directional direction in the foregoing L directional directions.

For specific content, refer to the foregoing records in this specification, and details are not described herein.

S3$_U$. The UE switches to a directional direction with best channel quality in the foregoing L directional directions.

For specific content, refer to the foregoing records in this specification, and details are not described herein.

S4$_U$. The UE sends S groups of pilots by using the foregoing directional direction with the best channel quality.

The foregoing S groups of pilots are received by the foregoing base station by using S directional directions, and the foregoing S groups of pilots are in a one-to-one correspondence with the foregoing S directional directions.

The foregoing S groups of pilots may be used by the base station to estimate channel quality corresponding to the foregoing S directional directions, and the foregoing channel quality may be used to at least determine an optimal directional direction in the foregoing S directional directions.

It should be noted that in the TDD mode, an uplink channel status and a downlink channel status are reciprocal. Therefore, the base station may perform uplink channel estimation by using an uplink pilot, so as to obtain downlink channel information by means of estimation. In this way, the base station does not need a feedback from the UE, the UE only needs to send S groups of uplink pilots to the base station, and the base station performs channel estimation to determine an optimal directional direction in S directional directions.

However, in the FDD mode, an uplink channel status and a downlink channel status are not reciprocal, that is, the base station cannot obtain downlink channel information by means of estimation by performing uplink channel estimation. Therefore, in the FDD mode, the base station needs to send S groups of downlink pilots, and the UE performs channel estimation and then feeds back related data to the base station.

Obviously, in the TDD mode, the base station may also send S groups of downlink pilots; the UE feeds back related data (a directional direction with best channel quality in the foregoing S directional directions or channel quality information); then the base station determines an optimal directional direction in the S directional directions. That is, the embodiments shown in FIG. 2 to FIG. 7 are also applicable to the single-link/single-user scenario/multi-link scenario in the TDD mode.

Figure 10:
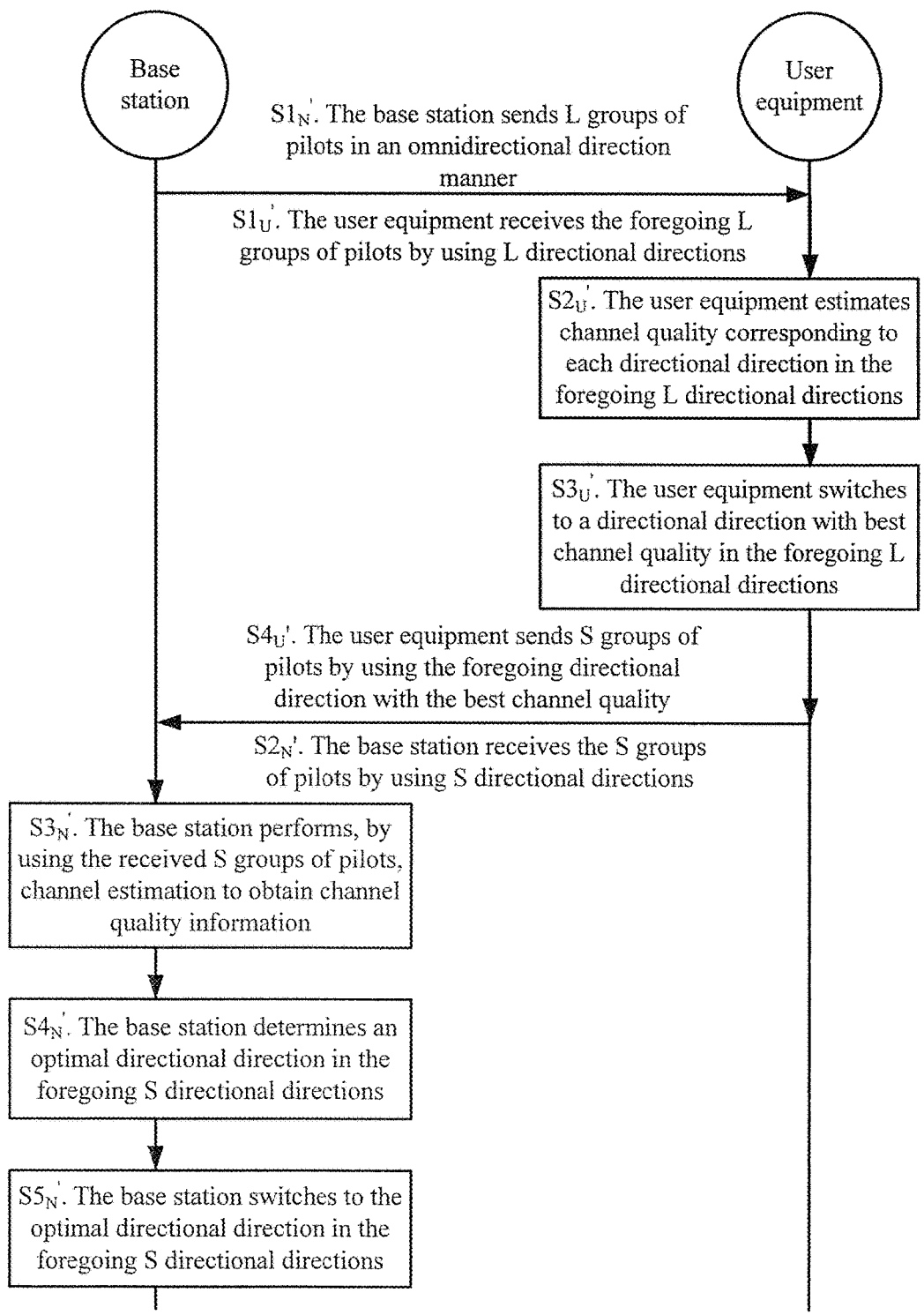
FIG. 10 is another flowchart of interaction between UE and a base station according to an embodiment of the present invention.

In the single-link/single-user scenario/multi-link scenario in the TDD mode, for a process of interaction between UE and a base station, reference may be further made to FIG. 10.

It should be noted that it is assumed that there are P links in the FDD mode or the TDD mode, and the P links may be used to execute the technical solutions provided in this embodiment of the present invention. Therefore, no matter how many links there are, complexity (a time used) of using the technical solutions provided in this embodiment of the present invention is still consistent with O(M+N). However, if an exhaustive attack method in the prior art is used, there are M*N combinations for one link, there are (M*N)² combinations for two links, and there are (M*N)^P combinations for P links. Complexity (a time used) of the exhaustive attack method is consistent with O(M*N)^P. Therefore, in a multi-link scenario, the technical solutions provided in this embodiment of the present invention have great advantages in reducing complexity.

The multi-user scenario in the FDD mode:

Similar to the single-link/single-user scenario/multi-link scenario in the FDD mode, in this scenario, a base station sends L groups of pilots in an omnidirectional direction manner, and each user (UE) receives the foregoing L groups of pilots by using L directional directions, performs channel estimation, and switches to a respective directional direction with best channel quality.

It is assumed that a quantity of the users/UEs is K and 2≤K. For convenience, a directional direction with best channel quality that is used by the $k^{th}$ UE is represented as an $n_k^*$ directional direction.

Figure 11:
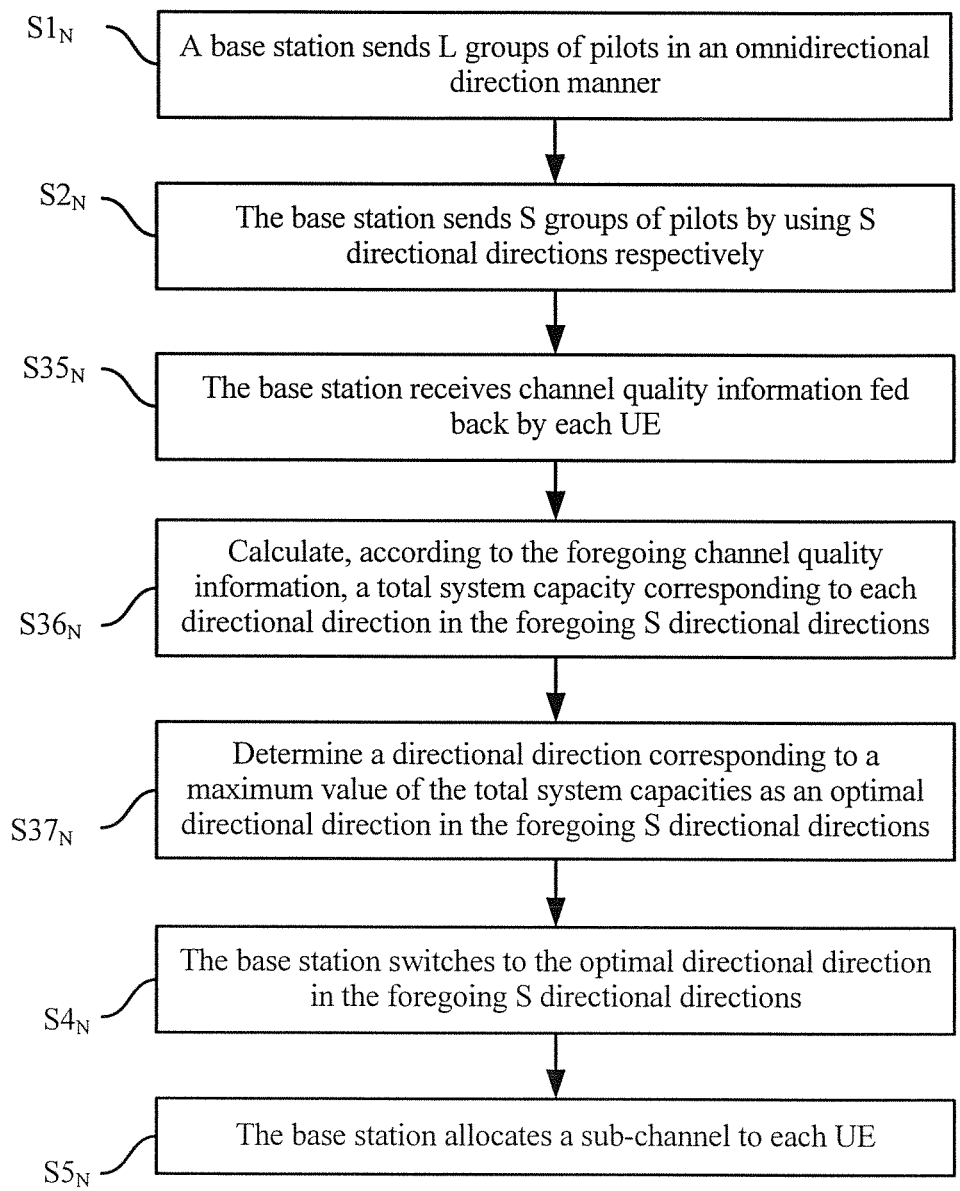
FIG. 11 is still another flowchart of a directional direction selection method according to an embodiment of the present invention.

For the FDD mode, referring to FIG. 11, a base station sends S groups of pilots by using S directional directions respectively. Correspondingly, the $k^{th}$ UE receives the foregoing S groups of pilots by using the $n_k^*$ directional direction, estimates channel quality corresponding to the foregoing S directional directions, and feeds back channel quality information.

It should be noted that because directional directions with best channel quality that are determined by the users (UEs) may be different from each other, if the UEs feed back the directional directions with best channel quality, the base station probably cannot accurately determine which directional direction to be subsequently used as an optimal directional direction. Therefore, in this scenario, the users feed back channel quality information to the base station, and the base station determines the optimal directional direction (represented as an $m_{opt}$ directional direction) in the foregoing S directional directions according to the foregoing channel quality information.

Therefore, in this scenario, step S3$_N$ in all the foregoing embodiments may include:

S35$_N$. The base station receives channel quality information fed back by each UE.

In this embodiment, the foregoing channel quality information may include channel quality corresponding to the S directional directions, or the foregoing channel quality information may include an index corresponding to a directional direction with best channel quality in the foregoing S directional directions and channel quality corresponding to the directional direction.

For convenience, channel quality information of the $j^{th}$ sub-channel that is obtained when the base station uses the $m^{th}$ directional direction in the S directional directions to send a group of pilots and the $k^{th}$ UE uses the $n_k^*$ directional direction to receive the group of pilots is represented as $G_k^d(m,n_k^*)_j$.

S36$_N$. Calculate, according to the foregoing channel quality information, a total system capacity corresponding to each directional direction in the foregoing S directional directions.

S37$_N$. Determine a directional direction corresponding to a maximum value of the total system capacities as the foregoing optimal directional direction (represented as an $m_{opt}$ directional direction).

More specifically, the total system capacity of each directional direction may be calculated by using the following method:

Step A: Calculate a channel capacity that is of the $j^{th}$ sub-channel and corresponding to each UE when the base station uses the $m^{th}$ directional direction; for the $k^{th}$ user, a calculation formula corresponding to the $k^{th}$ user is $\log_2(1+G_k^d(m,n_k^*)_j)$.

Step B: Calculate a maximum channel capacity of the $j^{th}$ sub-channel that is obtained when the base station uses the $m^{th}$ directional direction, where a calculation formula is $$\max_{k=1,2...K} \log_2(1 + G_k(m, n_k^*)_j);$$

that is, a maximum value of the channel capacities of the $j^{th}$ sub-channel that are corresponding to the users (UEs) is obtained.

For example, assuming that there are four users, and channel capacities of the $j^{th}$ sub-channel that are corresponding to the users are 5, 8, 10, and 7, 10 is used as the largest channel capacity of the $j^{th}$ sub-channel.

Step C: Sum largest channel capacities that are of all sub-channels and obtained when the base station uses the $m^{th}$ directional direction, where an obtained result of the summation is a corresponding total system capacity obtained when the base station uses the $m^{th}$ directional direction.

A calculation formula corresponding to step C is $$C_m = \sum_{j=1}^{J} \max_{k=1,2...K} \log_2(1 + G_k^d(m, n_k^*)_j),$$

where the foregoing $C_m$ represents the total system capacity corresponding to the $m^{th}$ directional direction.

For example, it is assumed that there are three sub-channels in total, S=4, and largest channel capacities of the sub-channels and total system capacities corresponding to the directional directions are shown in the following Table 2.

TABLE 2

| Sub-channel | Direction | | | |
| --- | --- | --- | --- | --- |
| | 1 | 2 | 3 | 4 |
| 1 | 1 | 3 | 7 | 6 |
| 2 | 9 | 4 | 2 | 3 |
| 3 | 5 | 1 | 2 | 5 |
| Sum (total system capacity) | 15 | 8 | 11 | 14 |

It may be learnt from Table 2 that the total system capacity corresponding to the directional direction 1 is the largest. Then, in step S37$_N$, the directional direction 1 is determined as the optimal directional direction.

It should be noted that in an embodiment in which UE needs to feed back channel quality information, the UE may feedback channel quality corresponding to each directional direction in the foregoing S directional directions. To reduce an amount of information to be fed back, the UE may also feedback a directional direction with best channel quality in the foregoing S directional directions and channel quality corresponding to the directional direction.

For example, the $k^{th}$ user may feedback an index (represented as $m_k^*$) corresponding to a directional direction with best channel quality in the foregoing S directional directions, and channel quality (which may be represented as $G_k^d(m_k^*, n_k^*)_j$, j=1, . . . J) that is of each sub-channel and corresponding to the directional direction.

Correspondingly, in step A of calculating the channel capacity that is of the $j^{th}$ sub-channel and corresponding to each UE when the base station uses the $m^{th}$ directional direction, because the $k^{th}$ UE feeds back only the channel quality corresponding to the $m_k^*$ directional direction, if $m \neq m_k^*$, the channel capacity corresponding to the $k^{th}$ UE may be set to 0, that is, $\log_2(1+G_k^d(m, n_k^*)_j)=0$, $m \neq m_k^*$.

It should be noted that in a single-user scenario, all J sub-channels are allocated to the user. Therefore, there is no need to allocate the sub-channels, and a system schedules only the user at a current moment.

However, in a multi-user scenario, the foregoing J sub-channels may be allocated to some different users in the system. Therefore, in another embodiment of the present invention, the method in all the foregoing embodiments may further include the following steps:

S5$_{N'}$. The base station allocates a sub-channel to each UE.

More specifically, step S5$_{N'}$ may further include the following steps:

comparing channel capacities of the $j^{th}$ sub-channel that are corresponding to the UEs when the base station uses the $m_{opt}$ directional direction and the UEs use the directional directions with the best channel quality; and allocating the foregoing $j^{th}$ sub-channel to UE corresponding to a maximum channel capacity value.

If the UE to which the $j^{th}$ sub-channel is allocated is represented as the $k_{j^{th}}^*$ UE (user), $$k_j^* = \arg\max_{k=1,2\ldots K} \log_2(1 + G_k(m_{opt}, n_k^*)_j).$$

For example, there are four users (a user 1, a user 2, a user 3, and a user 4) and five sub-channels (a sub-channel 1, a sub-channel 2, a sub-channel 3, a sub-channel 4, and a sub-channel 5).

It is assumed that when the base station uses the $m_{opt}$ directional direction, and the UEs separately use respective directional directions with best channel quality, channel capacities of the sub-channel 1 that are corresponding to the UEs are respectively 2 (corresponding to the user 1), 1 (corresponding to the user 2), 0.5 (corresponding to the user 3), and 3 (corresponding to the user 4). Then, the sub-channel 1 is allocated to the user 4.

It is assumed that when the base station uses the $m_{opt}$ directional direction, and the UEs separately use respective directional directions with best channel quality, channel capacities of the sub-channel 2 that are corresponding to the UEs are respectively 1 (corresponding to the user 1), 1 (corresponding to the user 2), 2 (corresponding to the user 3), and 0.7 (corresponding to the user 4). Then, the sub-channel 2 is allocated to the user 3.

It is assumed that when the base station uses the $m_{opt}$ directional direction, and the UEs separately use respective directional directions with best channel quality, channel capacities of the sub-channel 3 that are corresponding to the UEs are respectively 0.1 (corresponding to the user 1), 5 (corresponding to the user 2), 1 (corresponding to the user 3), and 1.7 (corresponding to the user 4). Then, the sub-channel 3 is allocated to the user 2.

It is assumed that when the base station uses the $m_{opt}$ directional direction, and the UEs separately use respective directional directions with best channel quality, channel capacities of the sub-channel 4 that are corresponding to the UEs are respectively 1.1 (corresponding to the user 1), 1 (corresponding to the user 2), 1 (corresponding to the user 3), and 3 (corresponding to the user 4). Then, the sub-channel 4 is allocated to the user 4.

It is assumed that when the base station uses the $m_{opt}$ directional direction, and the UEs separately use respective directional directions with best channel quality, channel capacities of the sub-channel 5 that are corresponding to the UEs are respectively 2.3 (corresponding to the user 1), 2 (corresponding to the user 2), 1 (corresponding to the user 3), and 3 (corresponding to the user 4). Then, the sub-channel 5 is allocated to the user 1.

If the $k^{th}$ user feeds back only the index (represented as $m_k^*$) corresponding to the directional direction with the best channel quality in the foregoing S directional directions, and channel quality (represented as $G_k^d(m_k^*, n_k^*)_j$, j=1, . . . J) corresponding to the directional direction, if $m_{opt} \neq m_k^*$, a channel capacity that is of each sub-channel and corresponding to the user may be set to 0.

The multi-user scenario in the TDD mode:

Similar to the single-link/single-user scenario/multi-link scenario in the TDD mode, in this scenario, a base station sends L groups of pilots in an omnidirectional direction manner, and each user (UE) receives the foregoing L groups of pilots by using L directional directions, performs channel estimation, and switches to a respective directional direction with best channel quality.

It is assumed that a quantity of the users/UEs is K and 2≤K. For convenience, a directional direction with best channel quality that is used by the $k^{th}$ UE is represented as an $n_k^*$ directional direction.

Figure 12:
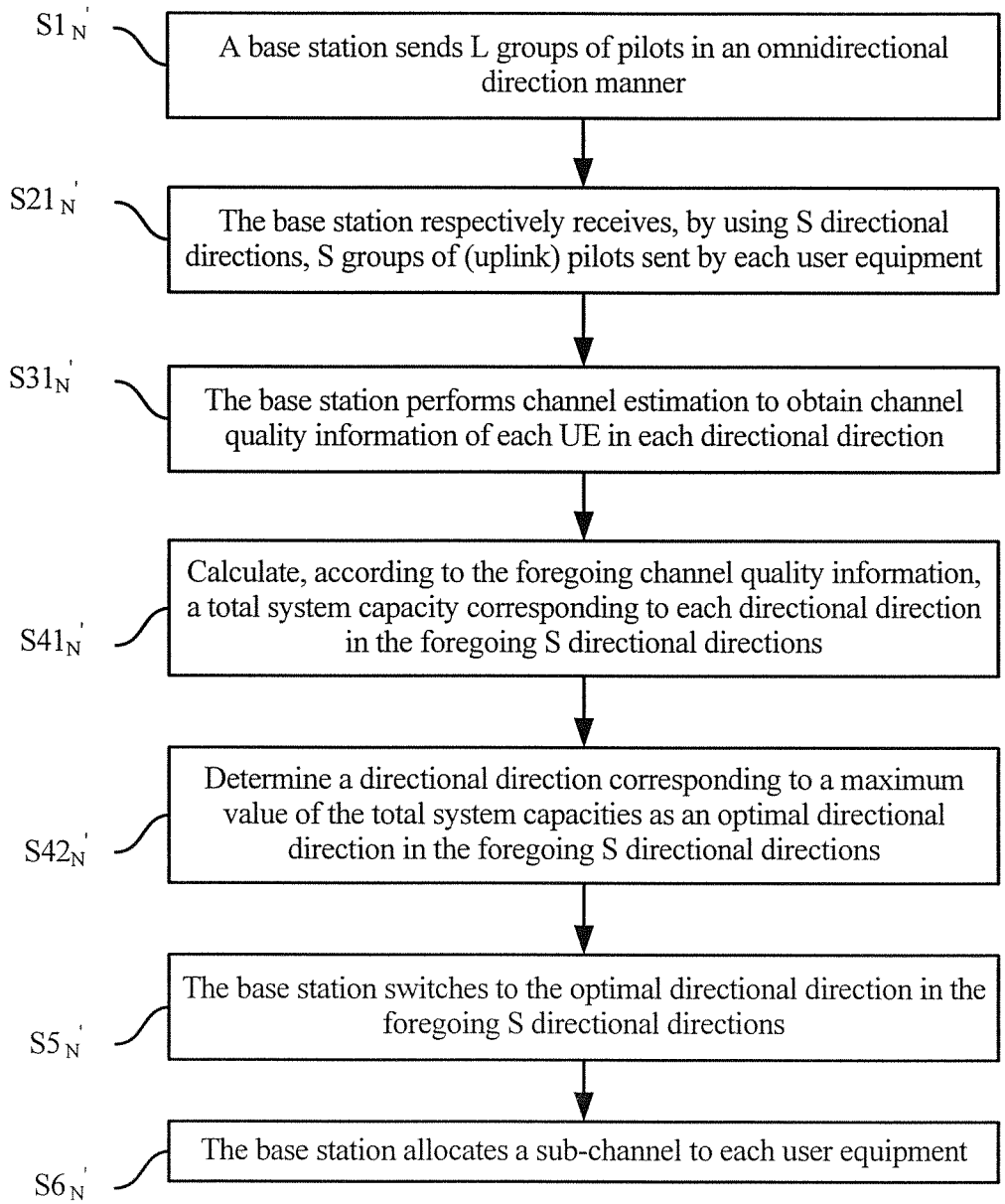
FIG. 12 is still another flowchart of a directional direction selection method according to an embodiment of the present invention.

For the TDD mode, referring to FIG. 12, in this scenario, step S2$_{N'}$ (separately transmitting S groups of pilots by using S directional directions) in all the foregoing embodiments may further include:

S21$_{N'}$. The base station respectively receives, by using the S directional directions, the S groups of (uplink) pilots sent by each UE.

That is, each UE sends S groups of pilots. The foregoing S groups of pilots are in a one-to-one correspondence with the foregoing S directional directions.

For example, it is assumed that S=3. Each UE sends a group of pilots at a t1 moment, and the base station receives the group of pilots by using a directional direction 1. Then, each UE sends a group of pilots at a t2 moment, and the base station receives the group of pilots by using a directional direction 2. Hereafter, each UE sends a group of pilots at a t3 moment, and the base station receives the group of pilots by using a directional direction 3.

Step S3$_{N'}$ in all the foregoing embodiments may further include:

S31$_{N'}$. The base station performs channel estimation by using the received S groups of pilots to obtain channel quality information of each UE in each directional direction.

Step S4$_{N'}$ in all the foregoing embodiments may further include:

S41$_{N'}$. Calculate, according to the foregoing channel quality information, a total system capacity corresponding to each directional direction in the foregoing S directional directions.

S42$_{N'}$. Determine a directional direction corresponding to a maximum value of the total system capacities as the foregoing optimal directional direction (represented as an m$_{opt}$ directional direction).

For specific details, refer to the related descriptions of the multi-user scenario in the FDD mode, and details are not described herein.

In another embodiment of the present invention, the method in all the foregoing embodiments may further include the following steps:

S6$_{N'}$. The base station allocates a sub-channel to each UE.

For specific details, refer to the detailed records of the multi-user scenario in the FDD mode, and details are not described herein.

Figure 13:
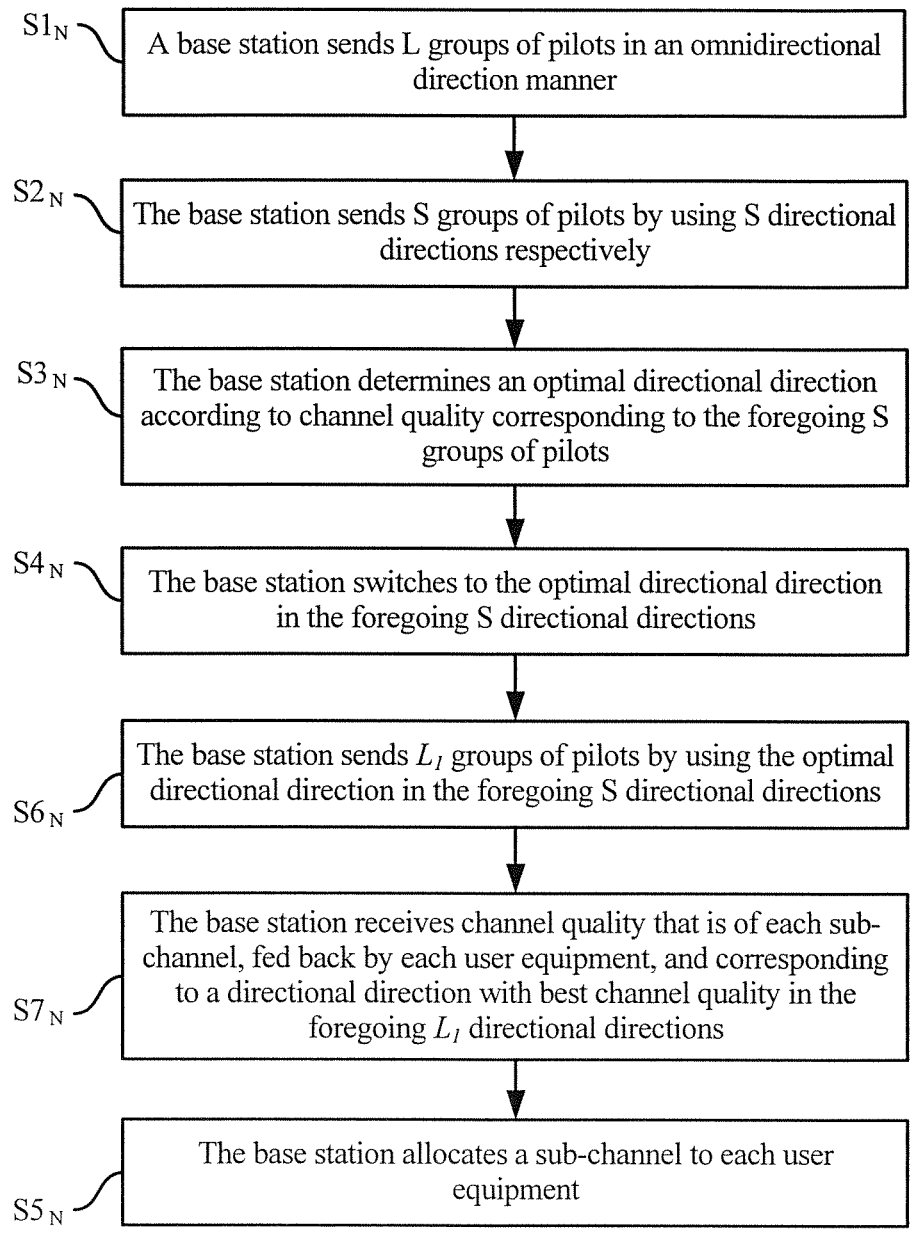
FIG. 13 is still another flowchart of a directional direction selection method according to an embodiment of the present invention.
Figure 14:
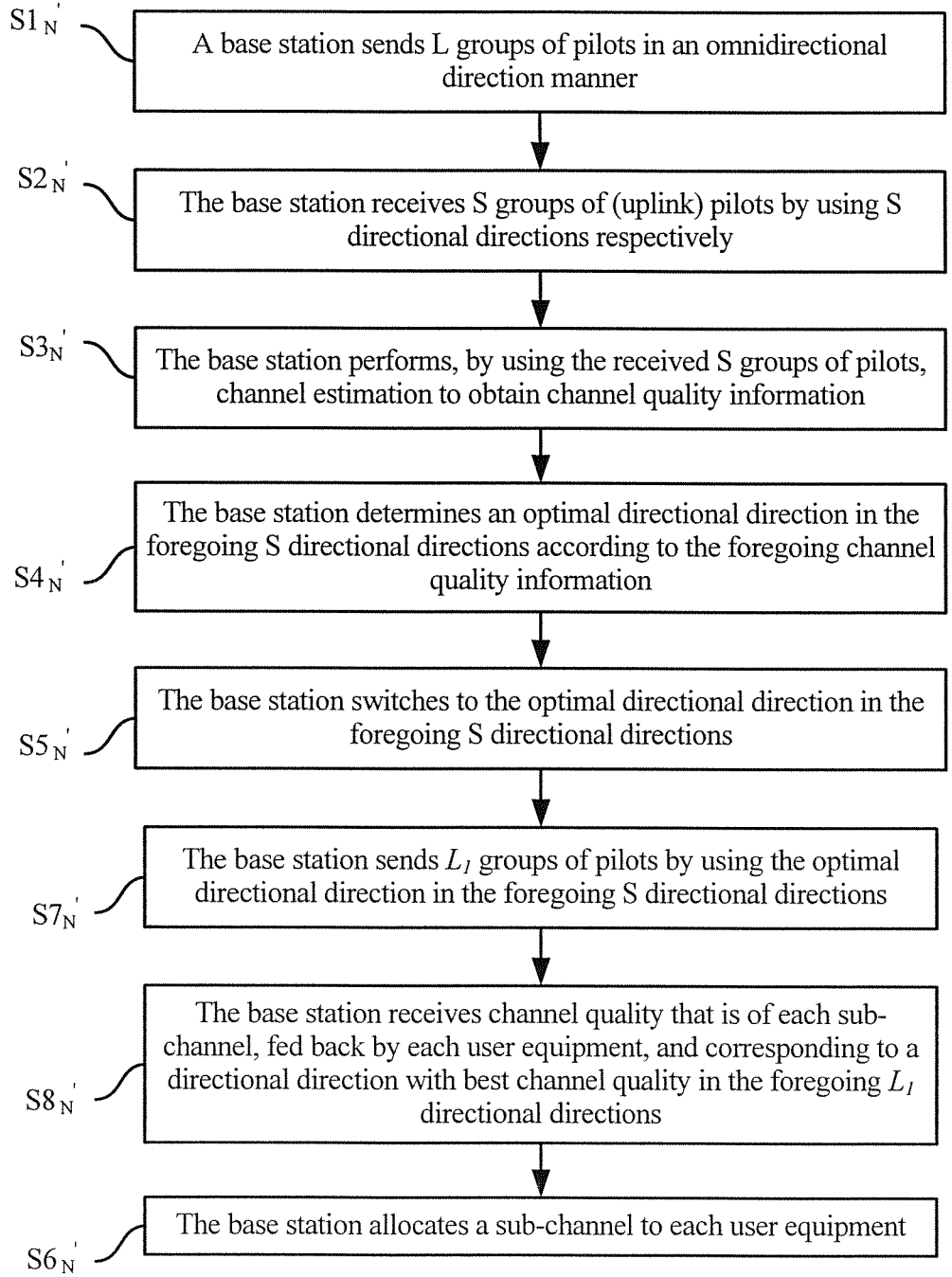
FIG. 14 is still another flowchart of a directional direction selection method according to an embodiment of the present invention.

Whether in the FDD multi-user scenario or the TDD multi-user scenario, to more accurately determine a combination manner of directional directions of the base station and directional directions of the UE, in another embodiment of the present invention, referring to FIG. 13 or FIG. 14, after the optimal directional direction is determined and before the sub-channel is allocated to each UE, all the foregoing embodiments may further include the following steps:

S6$_N$ (or S7$_{N'}$). The base station sends L$_1$ groups of pilots by using the foregoing m$_{opt}$ directional direction.

The foregoing L$_1$ groups of pilots are received by the UE by using L$_1$ directional directions.

The L$_1$ directional directions are in a one-to-one correspondence with the L$_1$ groups of pilots. That is, the UE changes a directional direction each time the UE receives a group of pilots.

The foregoing L$_1$ groups of pilots may be used by the UE to estimate channel quality corresponding to each directional direction in the L$_1$ directional directions and switch to a directional direction with best channel quality in the foregoing L$_1$ directional directions.

1≤L$_1$≤N, where a manner of setting a specific value of L$_1$ is similar to the foregoing manner of setting the specific value of L, and details are not described herein.

S7$_N$ (or S8$_{N'}$). The foregoing base station receives channel quality that is of each sub-channel, fed back by each UE, and corresponding to a directional direction with best channel quality in the foregoing L$_1$ directional directions.

For differentiation, a directional direction with best channel quality in L$_1$ directional directions of the k$^{th}$ UE is represented as n$_{opt,k}$*. For example, a directional direction with best channel quality in L$_1$ directional directions of the first UE is represented as n$_{opt,1}$*, and a directional direction with best channel quality in L$_1$ directional directions of the second UE is represented as n$_{opt,2}$*.

In addition, channel quality that is of the j$^{th}$ sub-channel and corresponding to the n$_{opt,k}$* directional direction of the k$^{th}$ UE is represented as G$_k^d$(m$_{opt}$,n$_{opt,k}$*)$_j$, where j represents a serial number of a sub-channel, and d represents directional.

Correspondingly, the foregoing step of "allocating a sub-channel to each UE" may further include:

comparing channel capacities of the j$^{th}$ sub-channel that are corresponding to the UEs when the base station uses the m$_{opt}$ directional direction and the UEs use the directional directions with the best channel quality in the L$_1$ directional directions; and allocating the foregoing j$^{th}$ sub-channel to UE corresponding to a maximum channel capacity value.

If the UE to which the j$^{th}$ sub-channel is allocated is represented as the k$_{j^{th}}$* UE (user), in this embodiment, $$k_j^* = \arg\max_{k=1,2...K} \log_2(1 + G_k^d(m_{opt}, n_{opt,k}^*)_j).$$

Figure 15A:
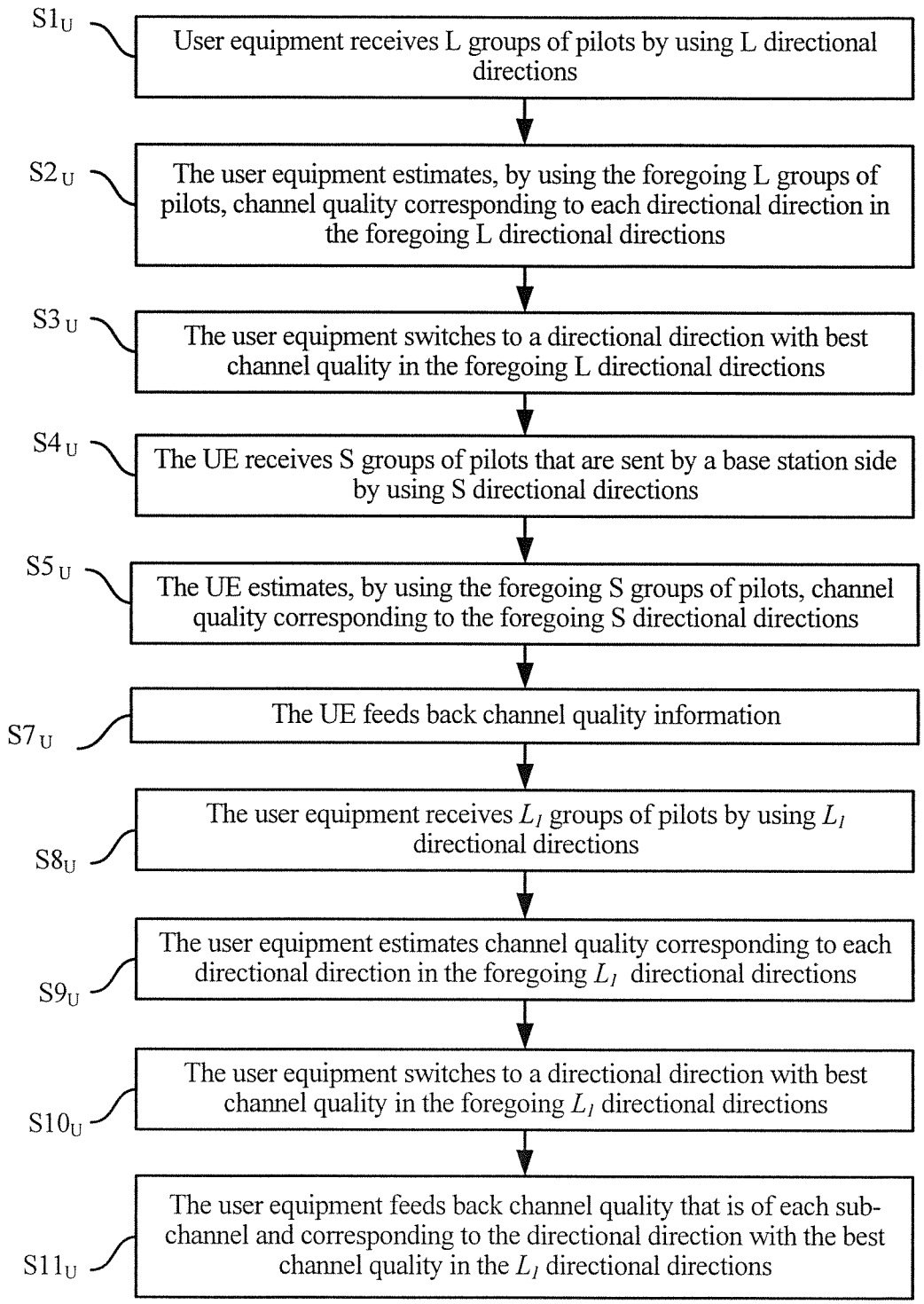
FIG. 15a is still another flowchart of a directional direction selection method according to an embodiment of the present invention.
Figure 15B:
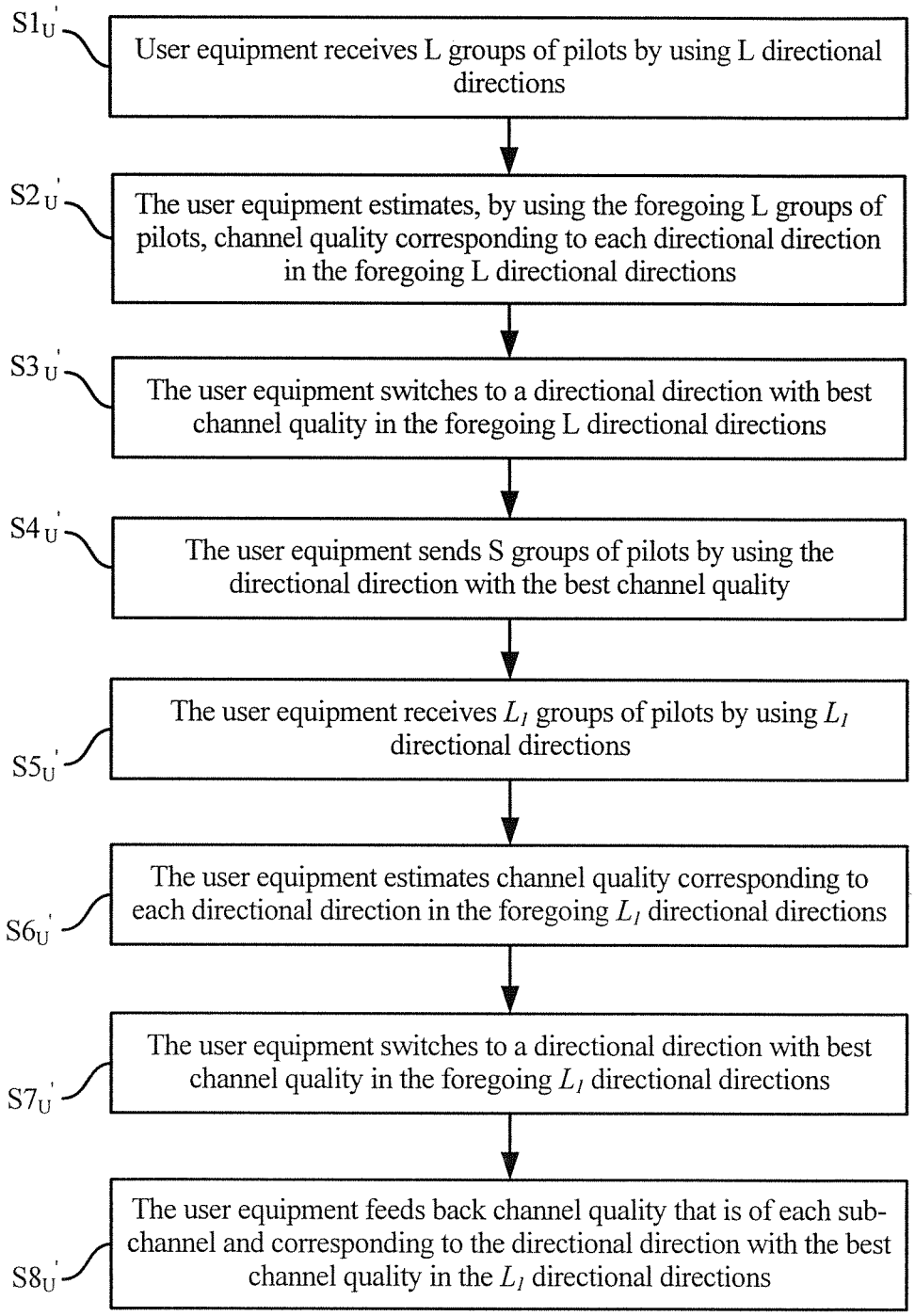
FIG. 15b is still another flowchart of a directional direction selection method according to an embodiment of the present invention.

Correspondingly, for the UE, referring to FIG. 15a or FIG. 15b, after S7$_U$ or S4$_{U'}$, steps executed by the UE may further include:

S8$_U$ (or S5$_{U'}$). The UE receives L$_1$ groups of pilots by using L$_1$ directional directions.

The foregoing L$_1$ groups of pilots are sent by the base station by using the foregoing optimal directional direction, and the foregoing L$_1$ directional directions are in a one-to-one correspondence with the foregoing L$_1$ groups of pilots, and L$_1$ is less than or equal to N.

S9$_U$ (or S6$_{U'}$). The UE estimates channel quality corresponding to each directional direction in the foregoing L$_1$ directional directions.

S10$_U$ (or S7$_{U'}$). The UE switches to a directional direction with best channel quality in the foregoing L$_1$ directional directions.

S11$_U$ (or S8$_{U'}$). The UE feeds back channel quality that is of each sub-channel and corresponding to the directional direction with the best channel quality in the L$_1$ directional directions.

Corresponding to the method, the embodiments of the present invention further provide a directional direction selection apparatus. The apparatus may be applied to a base station or UE.

More specifically, when being applied to the base station, the directional direction selection apparatus may be used as the foregoing scheduler or implement functions of the foregoing scheduler and the foregoing first reconfigurable antenna selector. When being applied to the UE, the directional direction selection apparatus may be used as the second reconfigurable antenna selector.

Figure 16A:
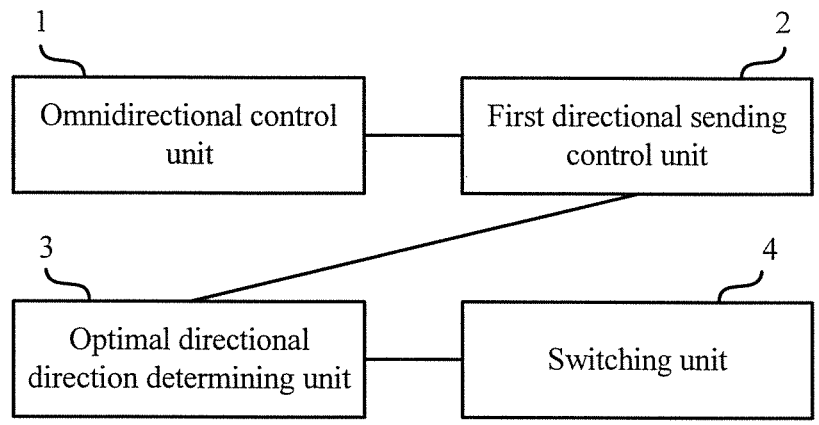
FIG. 16a is a schematic structural diagram of a directional direction selection apparatus according to an embodiment of the present invention.

Referring to FIG. 16a, when being applied to the base station, the foregoing directional direction selection apparatus may include an omnidirectional control unit 1, a first directional sending control unit 2, an optimal directional direction determining unit 3, and a switching unit 4.

The foregoing omnidirectional control unit 1 is configured to control a (first) pattern reconfigurable antenna to send L groups of pilots in an omnidirectional direction manner.

The foregoing L groups of pilots are received by the UE by using L directional directions, the foregoing L directional directions are in a one-to-one correspondence with the foregoing L groups of pilots, and the foregoing L groups of pilots may be used by the UE to estimate channel quality corresponding to each directional direction in the foregoing L directional directions and switch to a directional direction with best channel quality in the foregoing L directional directions.

For specific content, refer to the foregoing descriptions in this specification, and details are not described herein.

The foregoing first directional sending control unit 2 is configured to control the foregoing (first) pattern reconfigurable antenna to send S groups of pilots by using S directional directions respectively.

The foregoing S groups of pilots are received by the foregoing UE side by using the foregoing directional direction with the best channel quality, and the foregoing S groups of pilots are in a one-to-one correspondence with the foregoing S directional directions. For specific content, refer to the foregoing descriptions in this specification, and details are not described herein.

The foregoing optimal directional direction determining unit 3 is configured to determine an optimal directional direction in the foregoing S directional directions according to channel quality corresponding to the foregoing S groups of pilots.

For specific content, refer to the foregoing descriptions in this specification, and details are not described herein.

The foregoing switching unit 4 is configured to control the foregoing (first) pattern reconfigurable antenna to switch to the optimal directional direction in the foregoing S directional directions.

For specific content, refer to the foregoing descriptions in this specification, and details are not described herein.

The apparatus shown in FIG. 16a may be specifically applied to the single-link/single-user scenario/multi-link scenario in the FDD mode or the single-link/single-user scenario/multi-link scenario in the FDD mode.

In another embodiment of the present invention, in the aspect of determining an optimal directional direction in the foregoing S directional directions according to channel quality corresponding to the foregoing S groups of pilots, the optimal directional direction determining unit 3 may be specifically configured to:

receive channel quality information fed back by the foregoing UE side; and determine the optimal directional direction in the foregoing S directional directions according to the foregoing channel quality information, where the optimal directional direction is represented as an $m_{opt}$ directional direction, and the foregoing channel quality information may include the channel quality corresponding to the foregoing S directional directions, or a directional direction with best channel quality in the foregoing S directional directions and channel quality corresponding to the directional direction with the best channel quality in the foregoing S directional directions.

The optimal directional direction may be determined in multiple manners, for example, using a directional direction, in the S directional directions, corresponding to largest average channel quality of sub-channels as the optimal directional direction. For specific content, refer to the foregoing descriptions in this specification, and details are not described herein.

Alternatively, in another embodiment of the present invention, in the aspect of determining an optimal directional direction in the foregoing S directional directions according to channel quality corresponding to the foregoing S groups of pilots, the foregoing optimal directional direction determining unit 3 may be specifically configured to:

receive a directional direction with best channel quality in the foregoing S directional directions that is fed back by the UE; and determine the optimal directional direction in the foregoing S directional directions according to the foregoing directional direction with the best channel quality.

Figure 16B:
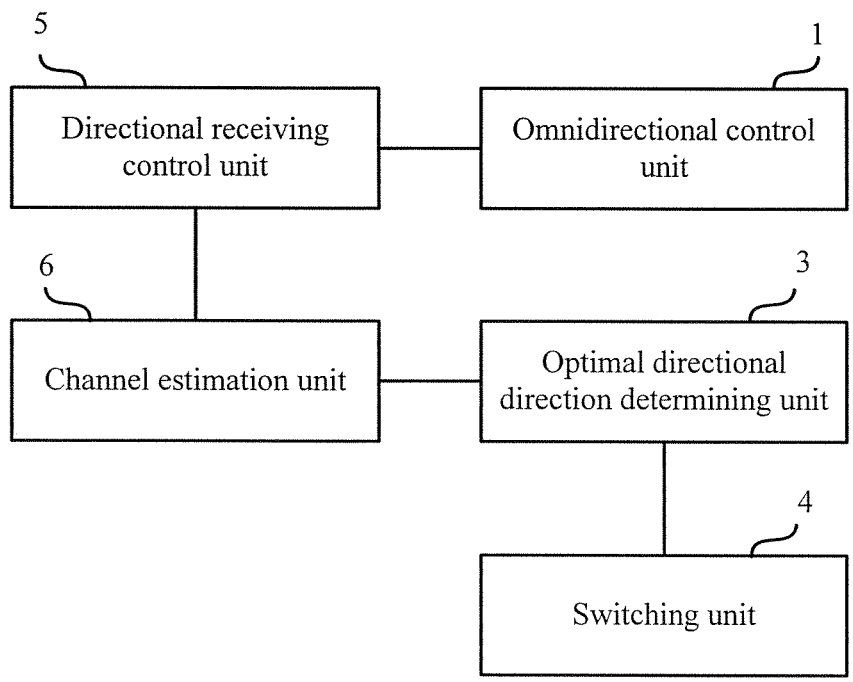
FIG. 16b is another schematic structural diagram of a directional direction selection apparatus according to an embodiment of the present invention.

FIG. 16b shows another structure of the foregoing directional direction selection apparatus (in the single-link/single-user scenario/multi-link scenario in the FDD mode), where the directional direction selection apparatus may include: an omnidirectional control unit 1, a directional receiving control unit 5, a channel estimation unit 6, an optimal directional direction determining unit 3, and a switching unit 4.

The omnidirectional control unit 1 is configured to control a (first) pattern reconfigurable antenna to send L groups of pilots in an omnidirectional direction manner.

For specific content, refer to the foregoing descriptions in this specification, and details are not described herein.

The directional receiving control unit 5 is configured to control the foregoing (first) pattern reconfigurable antenna to receive S groups of pilots by using S directional directions respectively.

The foregoing S groups of pilots are sent by the foregoing UE side by using the foregoing directional direction with best channel quality, and the foregoing S groups of pilots are in a one-to-one correspondence with the foregoing S directional directions. For specific content, refer to the foregoing descriptions in this specification, and details are not described herein.

The channel estimation unit 6 is configured to perform channel estimation by using the foregoing S groups of pilots to obtain channel quality information.

The channel quality information includes channel quality corresponding to each directional direction in the foregoing S directional directions. For specific content, refer to the foregoing descriptions in this specification, and details are not described herein.

The optimal directional direction determining unit 3 is configured to determine an optimal directional direction in the foregoing S directional directions according to the channel quality corresponding to the foregoing S groups of pilots.

For specific content, refer to the foregoing descriptions in this specification, and details are not described herein.

The switching unit 4 is configured to control the foregoing (first) pattern reconfigurable antenna to switch to the optimal directional direction in the foregoing S directional directions.

For specific content, refer to the foregoing descriptions in this specification, and details are not described herein.

Whether in the FDD mode or the TDD mode, in a multi-user scenario, in the foregoing aspect of determining an optimal directional direction in the foregoing S directional directions, the foregoing optimal directional direction determining unit 3 may be specifically configured to:

calculate, according to the channel quality information, a total system capacity corresponding to each directional direction in the foregoing S directional directions; and determine a directional direction corresponding to a maximum value of the total system capacities as the foregoing optimal directional direction.

More specifically, in the aspect of calculating, according to the channel quality information, a total system capacity corresponding to each directional direction in the foregoing S directional directions, the foregoing optimal directional direction determining unit 3 may be specifically configured to:

calculate a total system capacity corresponding to the $m^{th}$ directional direction in the foregoing S directional directions according to a formula $$C_m = \sum_{j=1}^{J} \max_{k=1,2\ldots K} \log_2(1 + G_k^d(m, n_k^*)_j),$$

where

J represents a total quantity of sub-channels, d represents directional, j represents a serial number of a sub-channel, $n_k^*$ represents a directional direction with best channel quality of the $k^{th}$ UE, $C_m$ represents the total system capacity corresponding to the $m^{th}$ directional direction, $\log_2(1+G(m, n_k^*)_j)$ represents a channel capacity that is of the $j^{th}$ sub-channel and corresponding to the $k^{th}$ UE when the foregoing $k^{th}$ UE uses the $n_k^*$ directional direction and the foregoing base station uses the $m^{th}$ directional direction, $G_k^d(m,n_k^*)_j$ represents channel quality that is of the $j^{th}$ sub-channel and corresponding to the $k^{th}$ UE when the foregoing $k^{th}$ UE uses the $n_k^*$ directional direction and the foregoing base station uses the $m^{th}$ directional direction, and $$\max_{k=1,2\ldots K} \log_2(1 + G_k(m, n_k^*)_j)$$

represents a maximum channel capacity that is of the $j^{th}$ sub-channel and obtained when the foregoing base station uses the $m^{th}$ directional direction.

For specific content, refer to the foregoing descriptions in this specification, and details are not described herein.

Figure 17A:
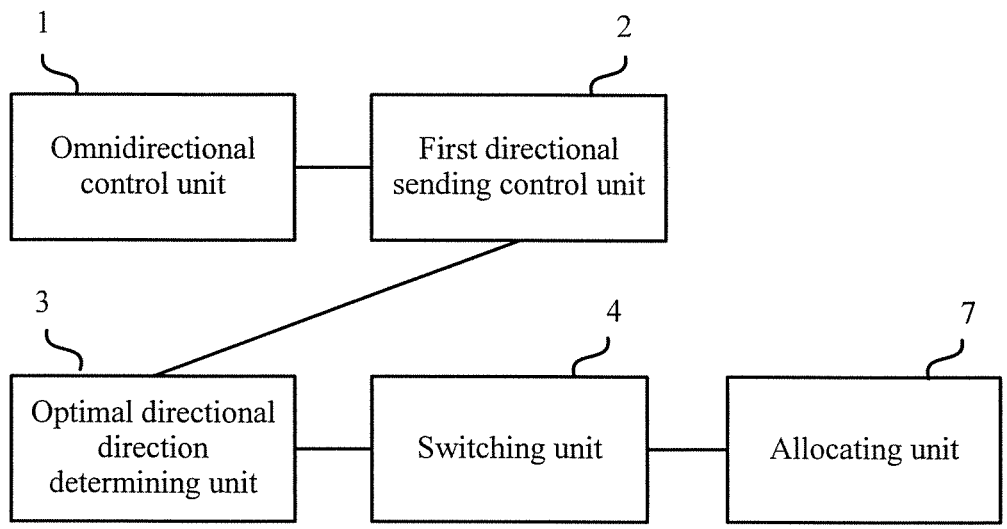
FIG. 17a is still another schematic structural diagram of a directional direction selection apparatus according to an embodiment of the present invention.
Figure 17B:
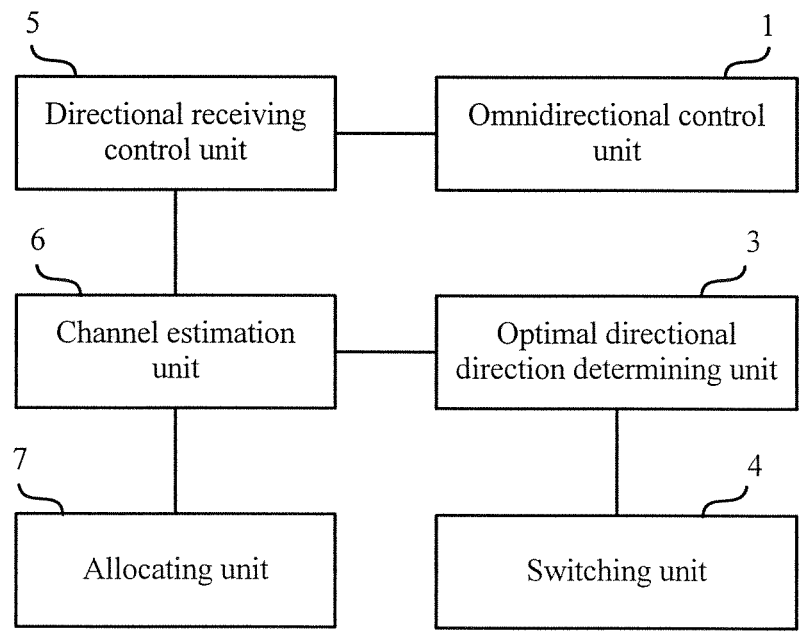
FIG. 17b is still another schematic structural diagram of a directional direction selection apparatus according to an embodiment of the present invention.

In another embodiment of the present invention, whether in the FDD mode or the TDD mode, in a multi-user scenario, referring to FIG. 17a or FIG. 17b, the apparatus in all the foregoing embodiments may further include: an allocating unit 5, configured to allocate a sub-channel to each UE.

In another embodiment of the present invention, in the aspect of allocating a sub-channel to each UE, the foregoing allocating unit 5 may be specifically configured to:

compare channel capacities of the $j^{th}$ sub-channel that are corresponding to the UEs when the foregoing base station uses an $m_{opt}$ directional direction and the UEs use directional directions with best channel quality; and allocate the foregoing $j^{th}$ sub-channel to UE corresponding to a maximum channel capacity value.

For specific content, refer to the foregoing descriptions in this specification, and details are not described herein.

Figure 18A:
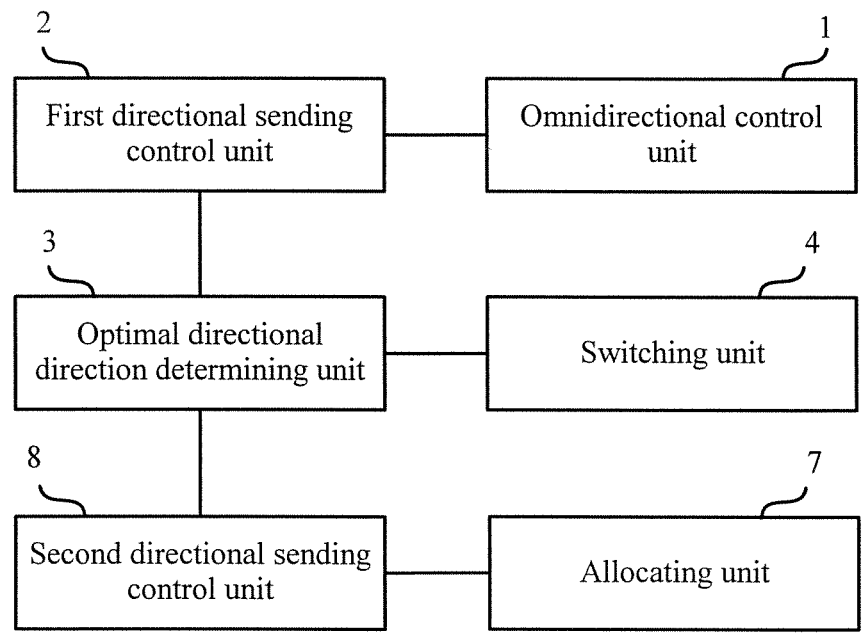
FIG. 18a is still another schematic structural diagram of a directional direction selection apparatus according to an embodiment of the present invention.
Figure 18B:
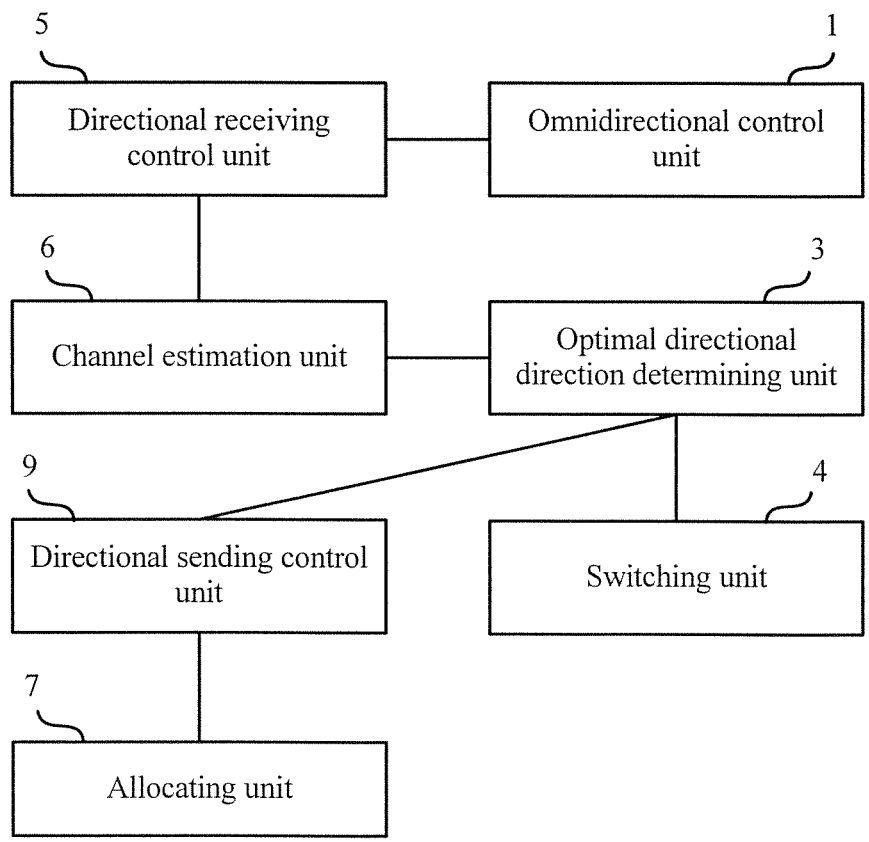
FIG. 18b is still another schematic structural diagram of a directional direction selection apparatus according to an embodiment of the present invention.

To determine a combination manner of directional directions of the base station and directional directions of the UE more accurately, referring to FIG. 18a or FIG. 18b, in another embodiment of the present invention, the apparatus in all the foregoing embodiments may further include:

a second directional sending control unit 8 (or a directional sending control unit 9), configured to control the foregoing pattern reconfigurable antenna to send $L_1$ groups of pilots by using the foregoing $m_{opt}$ directional direction after the foregoing optimal directional direction determining unit 3 determines the foregoing optimal directional direction and before the foregoing allocating unit 7 allocates the sub-channel to each UE.

The foregoing $L_1$ groups of pilots are received by the foregoing UE side by using $L_1$ directional directions, the foregoing $L_1$ directional directions are in a one-to-one correspondence with the foregoing $L_1$ groups of pilots, and the foregoing $L_1$ groups of pilots are used by the foregoing UE side to estimate channel quality corresponding to each directional direction in the foregoing $L_1$ directional directions and switch to a directional direction with best channel quality in the foregoing $L_1$ directional directions, where the directional direction with the best channel quality is represented as an $n_{opt}^*$ directional direction, and $L_1$ is less than or equal to N.

Figure 19A:
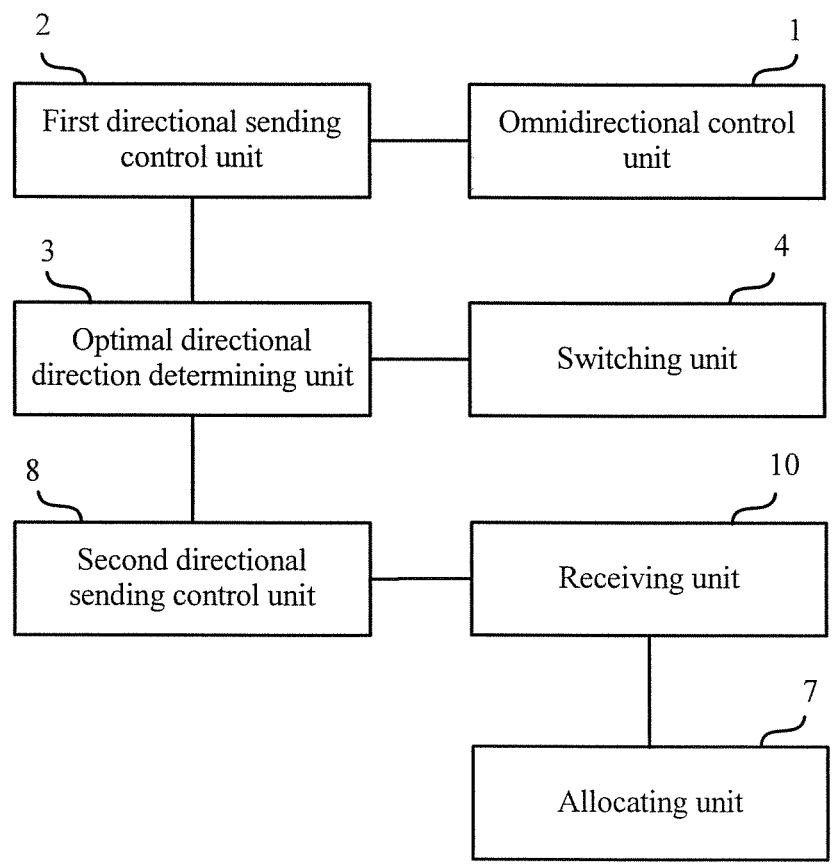
FIG. 19a is still another schematic structural diagram of a directional direction selection apparatus according to an embodiment of the present invention.
Figure 19B:
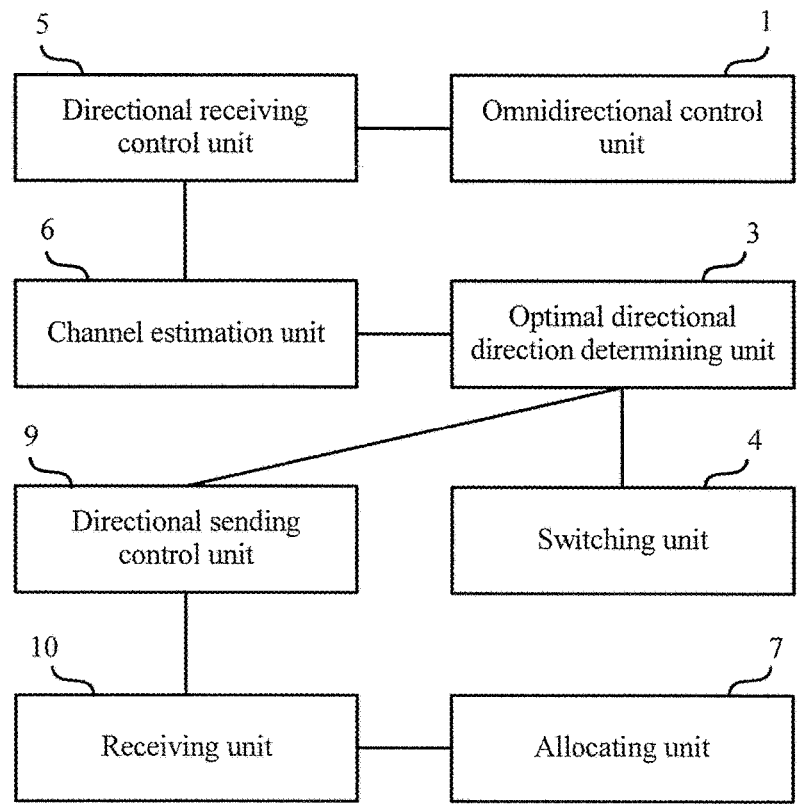
FIG. 19b is still another schematic structural diagram of a directional direction selection apparatus according to an embodiment of the present invention.

In another embodiment of the present invention, referring to FIG. 19a or FIG. 19b, the apparatus in all the foregoing embodiments may further include:

a receiving unit 10, configured to: after the $L_1$ groups of pilots are sent, control the foregoing (first) pattern reconfigurable antenna to receive channel quality that is of each sub-channel, fed back by each UE, and corresponding to a directional direction with best channel quality in the $L_1$ directional directions.

Correspondingly, in the aspect of allocating a sub-channel to each UE, the foregoing allocating unit 7 may be specifically configured to:

compare channel capacities of the $j^{th}$ sub-channel that are corresponding to the UEs when the UEs use $n_{opt}^*$ directional directions; and allocate the foregoing $j^{th}$ sub-channel to UE corresponding to a maximum channel capacity value.

For specific content, refer to the foregoing descriptions in this specification, and details are not described herein.

Figure 20:
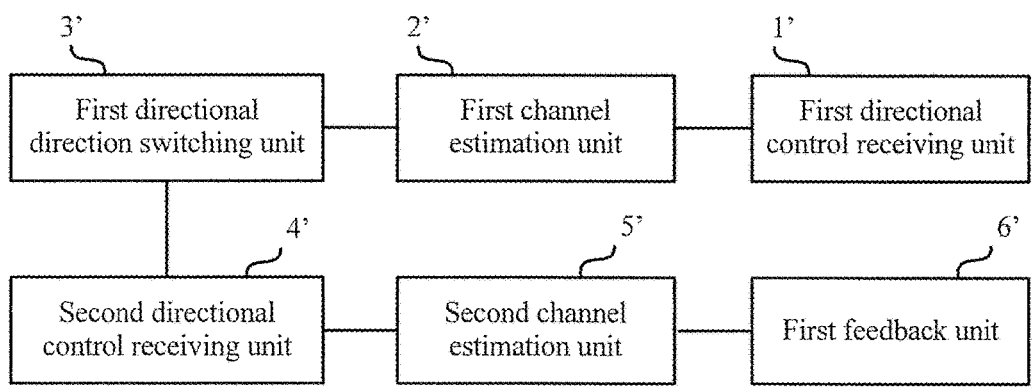
FIG. 20 is still another schematic structural diagram of a directional direction selection apparatus according to an embodiment of the present invention.

Referring to FIG. 20, when being applied to UE, the directional direction selection apparatus may include: a first directional control receiving unit 1', a first channel estimation unit 2', a first directional direction switching unit 3', a second directional control receiving unit 4', a second channel estimation unit 5', and a first feedback unit 6'.

The first directional control receiving unit 1' is configured to control a pattern reconfigurable antenna to receive L groups of pilots by using L directional directions.

The foregoing L groups of pilots are sent by a base station in an omnidirectional direction manner, the foregoing L directional directions are in a one-to-one correspondence with the foregoing L groups of pilots, L is less than or equal to N, and N is a quantity of reconfigurable directional directions supported by the UE.

For specific content, refer to the foregoing records in this specification, and details are not described herein.

The first channel estimation unit 2' is configured to estimate, by using the foregoing L groups of pilots, channel quality corresponding to each directional direction in the foregoing L directional directions.

For specific content, refer to the foregoing records in this specification, and details are not described herein.

The first directional direction switching unit 3' is configured to control the foregoing pattern reconfigurable antenna to switch to a directional direction with best channel quality in the foregoing L directional directions.

For specific content, refer to the foregoing records in this specification, and details are not described herein.

The second directional control receiving unit 4' is configured to control the foregoing pattern reconfigurable antenna to receive S groups of pilots by using the foregoing directional direction with the best channel quality, where S is less than or equal to M, and M is a quantity of reconfigurable directional directions supported by the foregoing base station. For specific content, refer to the foregoing records in this specification, and details are not described herein.

The second channel estimation unit 5' is configured to estimate, by using the foregoing S groups of pilots, channel quality corresponding to the foregoing S directional directions.

The first feedback unit 6' is configured to feed back channel quality information or a directional direction with best channel quality in the foregoing S directional directions to the foregoing base station, so that the foregoing base station determines an optimal directional direction in the foregoing S directional directions.

The foregoing channel quality information includes the channel quality corresponding to the foregoing S directional directions, or the directional direction with the best channel quality in the foregoing S directional directions and channel quality corresponding to the directional direction with the best channel quality in the S directional directions.

For specific content, refer to the foregoing records in this specification, and details are not described herein.

Figure 21:
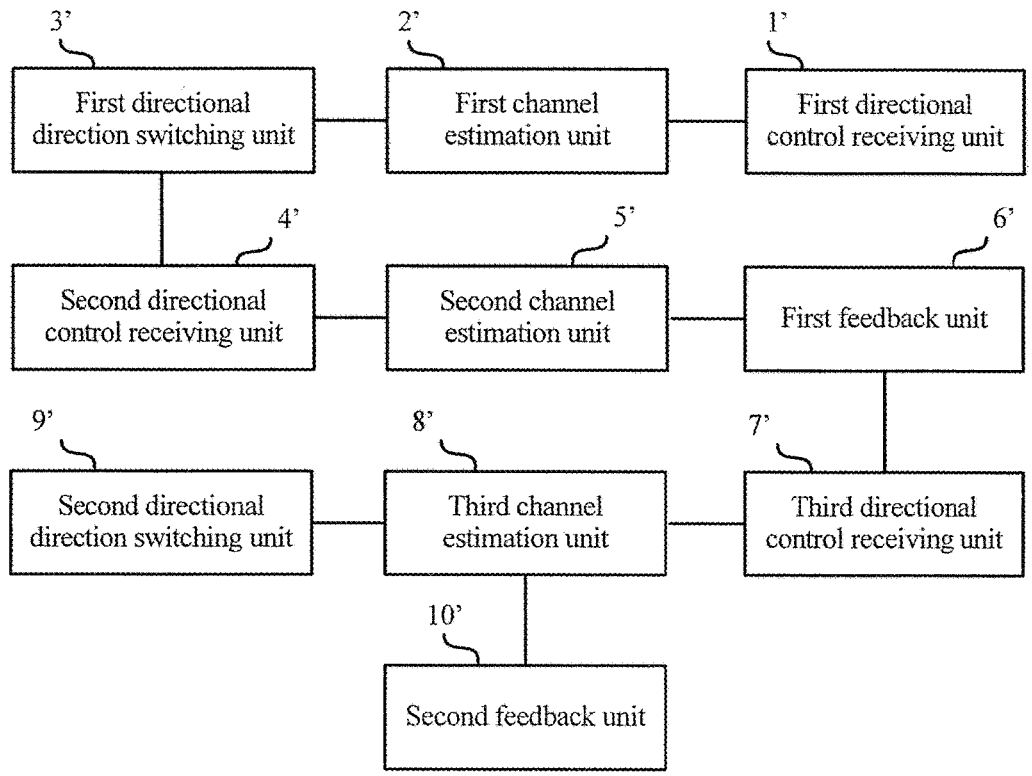
FIG. 21 is still another schematic structural diagram of a directional direction selection apparatus according to an embodiment of the present invention.

In another embodiment of the present invention, referring to FIG. 21, in the multi-user scenario in the FDD mode or the TDD mode, the apparatus in all the foregoing embodiments may further include:

a third directional control receiving unit 7', configured to control the foregoing pattern reconfigurable antenna to receive $L_1$ groups of pilots by using $L_1$ directional directions, where the foregoing $L_1$ groups of pilots are sent by the base station by using the foregoing optimal directional direction, the foregoing $L_1$ directional directions are in a one-to-one correspondence with the foregoing $L_1$ groups of pilots, and $L_1$ is less than or equal to N;

a third channel estimation unit 8', configured to estimate channel quality corresponding to each directional direction in the foregoing $L_1$ directional directions;

a second directional direction switching unit 9', configured to control the foregoing pattern reconfigurable antenna to switch to a directional direction with best channel quality in the foregoing $L_1$ directional directions, where the directional direction with the best channel quality is represented as an $n_{opt}$* directional direction; and a second feedback unit 10', configured to feed back channel quality that is of each sub-channel and corresponding to the foregoing $n_{opt}$* directional direction.

For specific content, refer to the foregoing records in this specification, and details are not described herein.

Figure 22:
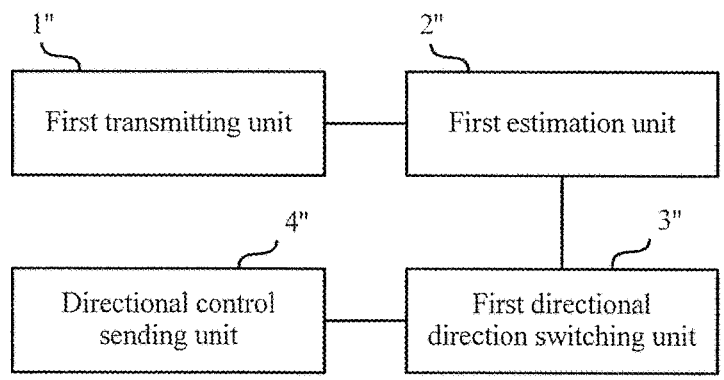
FIG. 22 is still another schematic structural diagram of a directional direction selection apparatus according to an embodiment of the present invention.

Alternatively, referring to FIG. 22, when being applied to UE, the foregoing directional direction selection apparatus may include: a first transmission unit 1", a first estimation unit 2", a first directional direction switching unit 3", and a directional control sending unit 4".

The first transmission unit 1" is configured to control a pattern reconfigurable antenna to receive L groups of pilots by using L directional directions, where the foregoing L groups of pilots are sent by a base station in an omnidirectional direction manner, the foregoing L directional directions are in a one-to-one correspondence with the foregoing L groups of pilots, L is less than or equal to N, and N is a quantity of reconfigurable directional directions supported by the UE.

For specific content, refer to the foregoing records in this specification, and details are not described herein.

The first estimation unit 2" is configured to estimate, by using the foregoing L groups of pilots, channel quality corresponding to each directional direction in the foregoing L directional directions.

For specific content, refer to the foregoing records in this specification, and details are not described herein.

The first directional direction switching unit 3" is configured to control the foregoing pattern reconfigurable antenna to switch to a directional direction with best channel quality in the foregoing L directional directions.

For specific content, refer to the foregoing records in this specification, and details are not described herein.

The directional control sending unit 4" is configured to send S groups of pilots by using the foregoing directional direction with the best channel quality, where the foregoing S groups of pilots are received by the base station by using S directional directions, and the foregoing S groups of pilots are in a one-to-one correspondence with the foregoing S directional directions, S is less than or equal to M, and M is a quantity of reconfigurable directional directions supported by the foregoing base station. For specific content, refer to the foregoing records in this specification, and details are not described herein.

Figure 23:
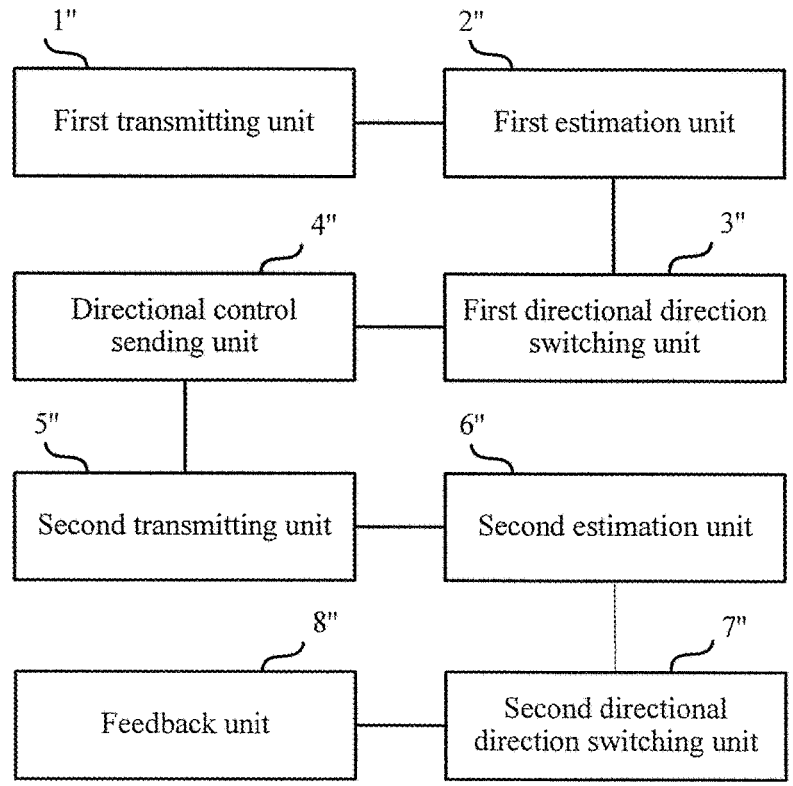
FIG. 23 is still another schematic structural diagram of a directional direction selection apparatus according to an embodiment of the present invention.

In another embodiment of the present invention, referring to FIG. 23, in the multi-user scenario in the FDD mode or the TDD mode, the apparatus in all the foregoing embodiments may further include:

a second transmission unit 5", configured to control the foregoing pattern reconfigurable antenna to receive $L_1$ groups of pilots by using $L_1$ directional directions, where the foregoing $L_1$ groups of pilots are sent by the base station by using the foregoing optimal directional direction, the foregoing $L_1$ directional directions are in a one-to-one correspondence with the foregoing $L_1$ groups of pilots, and $L_1$ is less than or equal to N;

a second estimation unit 6", configured to estimate channel quality corresponding to each directional direction in the foregoing $L_1$ directional directions;

a second directional direction switching unit 7", configured to control the foregoing pattern reconfigurable antenna to switch to a directional direction with best channel quality in the foregoing $L_1$ directional directions, where the directional direction with the best channel quality is represented as an $n_{opt}$* directional direction; and a feedback unit 8", configured to feed back channel quality that is of each sub-channel and corresponding to the foregoing $n_{opt}$* directional direction.

For specific content, refer to the foregoing records in this specification, and details are not described herein.

Figure 24:
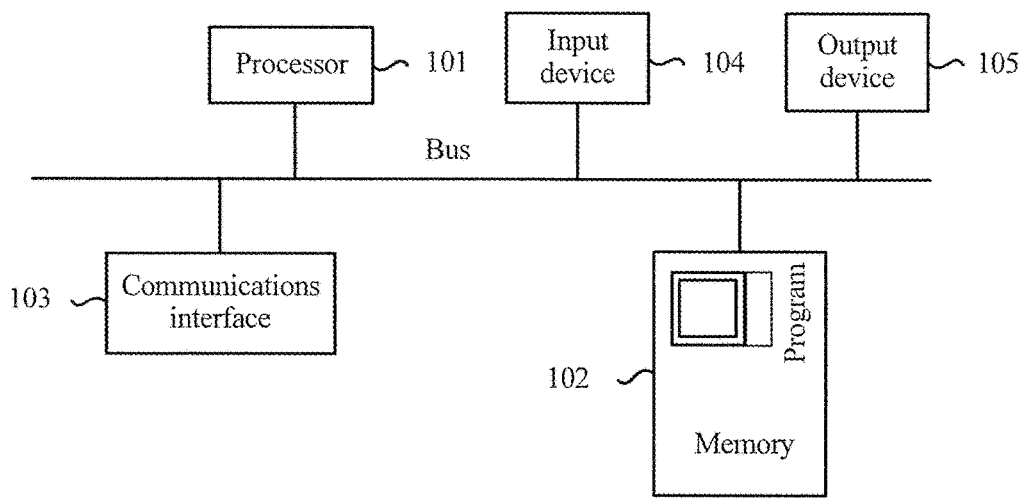
FIG. 24 is still another schematic structural diagram of a directional direction selection apparatus according to an embodiment of the present invention.

FIG. 24 shows a structure of a general-purpose computer system of the foregoing directional direction selection apparatus.

The computer system may be specifically a processor-based computer, for example, a general-purpose personal computer (PC), and a portable device such as a tablet computer or a smartphone.

More specifically, the foregoing computer system may include a bus, a processor 101, a memory 102, a communications interface 103, an input device 104, and an output device 105. The processor 101, the memory 102, the communications interface 103, the input device 104, and the output device 105 are connected to each other by using the bus, where:

the bus may include a path for delivering information between parts of the computer system.

The processor 101 may be a general-purpose processor, for example, a general-purpose central processing unit (CPU), a network processor (Network Processor, NP for short), and a microprocessor, or may be an application-specific integrated circuit (application-specific integrated circuit, ASIC), or one or more integrated circuits that are configured to control program execution of the solutions of the present invention. Alternatively, the processor 101 may be a digital signal processor (DSP), an application-specific integrated circuit (ASIC), a field programmable gate array (FPGA) or another programmable logic device, a discrete gate or transistor logic device, or a discrete hardware component.

The memory 102 stores a program for executing the technical solutions of the present invention, and may further store an operating system and another application program.

Specifically, the program may include program code, and the program code includes a computer operation instruction. More specifically, the memory 102 may be a read-only memory (read-only memory, ROM), a static storage device of another type that can store static information and a static instruction, a random access memory (random access memory, RAM), a dynamic storage device of another type that can store information and an instruction, or a magnetic disk memory.

The input device 104 may include an apparatus for receiving data and information that are input by a user, for example, a keyboard, a mouse, a camera, a scanner, a light pen, a voice input apparatus, and a touchscreen.

The output device 105 may include an apparatus that allows outputting information to a user, for example, a display screen, a printer, and a loudspeaker.

The communications interface 103 may include an apparatus using such a transceiver, so as to communicate with another device or communications network, for example, an Ethernet, a radio access network (RAN), and a wireless local area network (WLAN).

The processor 101 executes the program stored in the memory 102 and may be configured to implement the directional direction selection method that is executed by a base station and provided in the embodiments of the present invention, where the directional direction selection method may include the following steps:

control a pattern reconfigurable antenna to send L groups of pilots in an omnidirectional direction manner;

control the foregoing pattern reconfigurable antenna to send S groups of pilots by using S directional directions respectively;

determine an optimal directional direction in the foregoing S directional directions according to channel quality corresponding to the foregoing S groups of pilots; and control the foregoing pattern reconfigurable antenna to switch to the optimal directional direction in the foregoing S directional directions.

For specific details, refer to the foregoing records in this specification, and details are not described herein.

Alternatively, the processor 101 executes the program stored in the memory 102 and may be configured to implement another directional direction selection method that is executed by a base station and provided in the embodiments of the present invention, where the another directional direction selection method may include the following steps:

control a pattern reconfigurable antenna to send L groups of pilots in an omnidirectional direction manner;

control the foregoing pattern reconfigurable antenna to receive S groups of pilots by using S directional directions respectively;

perform channel estimation by using the foregoing S groups of pilots to obtain channel quality corresponding to each directional direction in the foregoing S directional directions;

determine an optimal directional direction in the foregoing S directional directions by using the foregoing channel quality information, where the optimal directional direction in the foregoing S directional directions is represented as an $m_{opt}$ directional direction; and control the foregoing pattern reconfigurable antenna to switch to the optimal directional direction in the foregoing S directional directions.

In another embodiment of the present invention, the processor 101 in all the foregoing embodiments may further execute the following step by running the software program stored in the foregoing memory and invoking the data stored in the foregoing memory: allocate a sub-channel to each UE.

In another embodiment of the present invention, after the foregoing optimal directional direction is determined and before the sub-channel is allocated to each UE, the processor 101 in all the foregoing embodiments may further execute the following step by running the software program stored in the foregoing memory and invoking the data stored in the foregoing memory:

control the foregoing pattern reconfigurable antenna to send $L_1$ groups of pilots by using the foregoing $m_{opt}$ directional direction, where the foregoing $L_1$ groups of pilots are received by the foregoing UE side by using $L_1$ directional directions, the foregoing $L_1$ directional directions are in a one-to-one correspondence with the foregoing $L_1$ groups of pilots, the foregoing $L_1$ groups of pilots are used by the foregoing UE side to estimate channel quality corresponding to each directional direction in the foregoing $L_1$ directional directions and switch to a directional direction with best channel quality in the foregoing $L_1$ directional directions, and $L_1$ is less than or equal to N.

In another embodiment of the present invention, after the $L_1$ groups of pilots are sent, the processor 101 in all the foregoing embodiments may further execute the following step by running the software program stored in the foregoing memory and invoking the data stored in the foregoing memory:

control the foregoing pattern reconfigurable antenna to receive channel quality that is of each sub-channel, fed back by each UE, and corresponding to the directional direction with the best channel quality in the $L_1$ directional directions.

For specific details, refer to the foregoing records in this specification, and details are not described herein.

In addition, the foregoing apparatus may further complete other steps that are related to the method completed by the base station and described in the method part in this specification and specify the steps, and details are not described herein.

When being applied to the UE, the processor 101 in all the foregoing embodiments may execute the following steps by running the software program stored in the foregoing memory and invoking the data stored in the foregoing memory:

control a (second) pattern reconfigurable antenna to receive L groups of pilots by using L directional directions;

estimate, by using the foregoing L groups of pilots, channel quality corresponding to each directional direction in the foregoing L directional directions;

control the foregoing (second) pattern reconfigurable antenna to switch to a directional direction with best channel quality in the foregoing L directional directions;

control the foregoing (second) pattern reconfigurable antenna to receive, by using the directional direction with the best channel quality, S groups of pilots sent by the base station by using S directional directions, where S is less than or equal to M, and M is a quantity of reconfigurable directional directions supported by the foregoing base station;

estimate, by using the foregoing S groups of pilots, channel quality corresponding to the foregoing S directional directions; and feed back channel quality information or a directional direction with best channel quality in the foregoing S directional directions, so that the base station determines an optimal directional direction in the foregoing S directional directions, where the foregoing channel quality information includes the channel quality corresponding to the S directional directions, or the directional direction with the best channel quality in the S directional directions and channel quality corresponding to the directional direction with the best channel quality in the S directional directions.

For specific details, refer to the foregoing records in this specification, and details are not described herein.

Alternatively, the processor 101 executes the program stored in the memory 102 and may be configured to implement another directional direction selection method that is executed by the UE and provided in the embodiments of the present invention, where the another directional direction selection method may include the following steps:

control a (second) pattern reconfigurable antenna to receive L groups of pilots by using L directional directions;

estimate, by using the foregoing L groups of pilots, channel quality corresponding to each directional direction in the foregoing L directional directions;

control the foregoing (second) pattern reconfigurable antenna to switch to a directional direction with best channel quality in the foregoing L directional directions; and control the foregoing (second) pattern reconfigurable antenna to send S groups of pilots by using the directional direction with the best channel quality in the foregoing L directional directions, where the foregoing S groups of pilots are received by the base station by using S directional directions, and $1 \leq S \leq M$.

The foregoing S groups of pilots are used by the base station to estimate channel quality corresponding to the foregoing S directional directions, and the channel quality is used to determine an optimal directional direction in the foregoing S directional directions.

In another embodiment of the present invention, the processor 101 in all the foregoing embodiments may further execute the following steps by running the software program stored in the foregoing memory and invoking the data stored in the foregoing memory:

control the foregoing (second) pattern reconfigurable antenna to receive $L_1$ groups of pilots by using $L_1$ directional directions, where the foregoing $L_1$ groups of pilots are sent by the base station by using the foregoing optimal directional direction, the foregoing $L_1$ directional directions are in a one-to-one correspondence with the foregoing $L_1$ groups of pilots, and $L_1$ is less than or equal to N;

estimate channel quality corresponding to each directional direction in the foregoing $L_1$ directional directions;

control the foregoing (second) pattern reconfigurable antenna to switch to a directional direction with best channel quality in the foregoing $L_1$ directional directions, where the directional direction with the best channel quality is represented as an $n_{opt}^*$ directional direction; and feed back channel quality that is of each sub-channel and corresponding to the foregoing $n_{opt}^*$ directional direction.

For specific details, refer to the foregoing records in this specification, and details are not described herein.

In the present invention, the processor 101 and the memory 102 may be integrated into a same chip, or may be two independent components.

Correspondingly, the embodiments of the present invention further claim protection for a directional direction selection system, where the directional direction selection system may include a (first) reconfigurable antenna and any directional direction selection apparatus (applied to a base station) in all the foregoing embodiments. In this embodiment, the directional direction selection system may be specifically used as a base station.

Alternatively, the foregoing directional direction selection system may include a (second) reconfigurable antenna and any directional direction selection apparatus (applied to UE) in all the foregoing embodiments. In this embodiment, the directional direction selection system may be specifically used as UE.

The embodiments in this specification are all described in a progressive manner, for same or similar parts in the embodiments, reference may be made to these embodiments, and each embodiment focuses on a difference from other embodiments. The apparatus provided in the embodiment is basically similar to the method provided in the embodiment, and therefore is described briefly; for related parts, reference may be made to partial descriptions of the method.

It should further be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

Based on the description of the foregoing implementation manners, a person skilled in the art may clearly understand that the present invention may be implemented by software in addition to necessary universal hardware, where the universal hardware includes a universal integrated circuit, a universal CPU, a universal memory, a universal component, or the like, or may be implemented by dedicated hardware, including an application-specific integrated circuit, a dedicated CPU, a dedicated memory, a dedicated component, or the like. In most circumstances, the former is a preferred implementation manner. Based on such an understanding, the technical solutions of the present invention essentially or the part contributing to the prior art may be implemented in a form of a software product. The computer software product is stored in a readable storage medium, for example, various media that can store software program code, such as a USB flash drive, a removable hard disk, a read-only memory (ROM, Read-Only Memory), a random access memory (RAM, Random Access Memory), a magnetic disk, or an optical disc, and includes several instructions for instructing a computer device (which may be a personal computer, a server, a network device, or the like) to perform the methods described in the embodiments of the present invention.

The embodiments provided above are described to enable a person skilled in the art to implement or use the present invention. Various modifications to the embodiments are obvious to the person skilled in the art, and general principles defined in this specification may be implemented in other embodiments without departing from the spirit or scope of the present invention. Therefore, the present invention will not be limited to the embodiments described in this specification but extends to the widest scope that complies with the principles and novelty provided in this specification.

What is claimed is:

1. A directional direction selection method, comprising:

sending, by a base station, L groups of pilots in an omnidirectional direction manner, wherein the L groups of pilots are received by user equipment (UE) using L directional directions, in a one-to-one correspondence with the L groups of pilots, the L groups of pilots are used by the UE to estimate channel quality corresponding to each directional direction in the L directional directions and switch to a directional direction with best channel quality in the L directional directions, wherein L is less than or equal to N, and N is a quantity of reconfigurable directional directions supported by the UE;

sending, by the base station, S groups of pilots by using S directional directions respectively, wherein the S groups of pilots are received by the UE by using the directional direction with the best channel quality in the L directional directions, the S groups of pilots are in a one-to-one correspondence with the S directional directions, 1≤S≤M, M is a quantity of reconfigurable directional directions supported by the base station, and the S groups of pilots are used by the UE to estimate channel quality corresponding to the S directional directions;

determining, by the base station, an optimal directional direction in the S directional directions according to the channel quality corresponding to the S groups of pilots, wherein the optimal directional direction in the S directional directions is represented as an $m_{opt}$ directional direction; and switching, by the base station, to the optimal directional direction in the S directional directions.

2. The method according to claim 1, wherein determining an optimal directional direction in the S directional directions according to the channel quality corresponding to the S groups of pilots comprises:

receiving, by the base station, channel quality information fed back by the UE; and determining, by the base station, the optimal directional direction in the S directional directions according to the channel quality information, wherein the channel quality information comprises the channel quality corresponding to the S directional directions, or a directional direction with best channel quality in the S directional directions and channel quality corresponding to the directional direction with the best channel quality in the S directional directions.

3. The method according to claim 1, wherein determining an optimal directional direction in the S directional directions according to the channel quality corresponding to the S groups of pilots comprises:

receiving, by the base station, a directional direction with best channel quality in the S directional directions that is fed back by the UE; and determining, by the base station, the optimal directional direction in the S directional directions according to the directional direction with the best channel quality.

4. The method according to claim 2, wherein:

a quantity of the UEs is K, wherein K is greater than or equal to 2; and the method further comprises:

allocating, by the base station, a sub-channel to each UE.

5. The method according to claim 4, wherein determining the optimal directional direction in the S directional directions comprises:

calculating, according to the channel quality information, a total system capacity corresponding to each directional direction in the S directional directions; and determining a directional direction corresponding to a maximum value of the total system capacities as the optimal directional direction.

6. The method according to claim 5, wherein calculating, according to the channel quality information, a total system capacity corresponding to each directional direction in the S directional directions comprises:

calculating a total system capacity corresponding to an $m^{th}$ directional direction in the S directional directions according to a formula $$C_m = \sum_{j=1}^{J} \max_{k=1,2...K} \log_2(1 + G_k^d(m, n_k^*)_j),$$

wherein 1≤m≤S, J represents a total quantity of sub-channels, d represents directional, j represents a serial number of a sub-channel, $n_k^*$ represents a directional direction with best channel quality of a $k^{th}$ UE, $C_m$ represents the total system capacity corresponding to the $m^{th}$ directional direction, $\log_2(1+G_k^d(m,n_k^*)_j)$ represents a channel capacity that is of a $j^{th}$ sub-channel and corresponding to the $k^{th}$ UE when the $k^{th}$ UE uses the $n_k^*$ directional direction and the base station uses the $m^{th}$ directional direction, $G_k^d(m,n_k^*)_j)$ represents channel quality that is of the $j^{th}$ sub-channel and corresponding to the $k^{th}$ UE when the $k^{th}$ UE uses the $n_k^*$ directional direction and the base station uses the $m^{th}$ directional direction, and $$\max_{k=1,2...K} \log_2(1 + G_k(m, n_k^*)_j)$$

represents a maximum channel capacity that is of the $j^{th}$ sub-channel and obtained when the base station uses the $m^{th}$ directional direction.

7. The method according to claim 6, wherein allocating a sub-channel to each UE comprises:

comparing channel capacities of the $j^{th}$ sub-channel that are corresponding to the UEs when the base station uses the $m_{opt}$ directional direction and the UEs use directional directions with best channel quality; and allocating the $j^{th}$ sub-channel to UE corresponding to a maximum channel capacity value.

8. The method according to claim 4, after determining the optimal directional direction and before the allocating a sub-channel to each UE, the method further comprises:

sending, by the base station, $L_1$ groups of pilots by using the $m_{opt}$ directional direction, wherein the $L_1$ groups of pilots are received by the UE by using $L_1$ directional directions, the $L_1$ directional directions are in a one-to-one correspondence with the $L_1$ groups of pilots, 1≤$L_1$≤N, and the $L_1$ and the groups of pilots are used by the UE to estimate channel quality corresponding to each directional direction in the $L_1$ directional directions and switch to a directional direction with best channel quality in the $L_1$ directional directions.

9. The method according to claim 8, wherein after sending $L_1$ groups of pilots, the method further comprises:

receiving, by the base station, channel quality that is of each sub-channel, fed back by each UE, and corresponding to the directional direction with the best channel quality in the $L_1$ directional directions.

10. The method according to claim 9, wherein allocating a sub-channel to each UE comprises:
comparing channel capacities of the $j^{th}$ sub-channel that are corresponding to the UEs when the UEs use the directional directions with the best channel quality in the $L_1$ directional directions; and
allocating the $j^{th}$ sub-channel to UE corresponding to a maximum channel capacity value.

11. A directional direction selection method, comprising:
receiving, by user equipment (UE), L groups of pilots by using L directional directions, wherein the L groups of pilots are sent by a base station in an omnidirectional direction manner, the L directional directions are in a one-to-one correspondence with the L groups of pilots, wherein L is less than or equal to N, and N is a quantity of reconfigurable directional directions supported by the UE;
estimating, by the UE by using the L groups of pilots, channel quality corresponding to each directional direction in the L directional directions;
switching, by the UE, to a directional direction with best channel quality in the L directional directions;
receiving, by the UE by using the directional direction with the best channel quality in the L directional directions, S groups of pilots that are sent by the base station by using S directional directions, wherein the S groups of pilots are in a one-to-one correspondence with the S directional directions, wherein $1 \leq S \leq M$, and M is a quantity of reconfigurable directional directions supported by the base station;
estimating, by the UE by using the S groups of pilots, channel quality corresponding to the S directional directions; and
feeding back, by the UE, channel quality information or a directional direction with best channel quality in the S directional directions to the base station, so that the base station determines an optimal directional direction in the S directional directions, wherein the channel quality information comprises the channel quality corresponding to the S directional directions, or the directional direction with the best channel quality in the S directional directions and channel quality corresponding to the directional direction with the best channel quality in the S directional directions.

12. The method according to claim 11, further comprising:
receiving, by the UE, $L_1$ groups of pilots by using $L_1$ directional directions, wherein the $L_1$ groups of pilots are sent by the base station by using the optimal directional direction, the $L_1$ directional directions are in a one-to-one correspondence with the $L_1$ groups of pilots, and wherein $L_1$ is less than or equal to N;
estimating, by the UE, channel quality corresponding to each directional direction in the $L_1$ directional directions;
switching, by the UE, to a directional direction with best channel quality in the $L_1$ directional directions, wherein the directional direction with the best channel quality is represented as an $n_{opt}^*$ directional direction; and
feeding back, by the UE, channel quality that is of each sub-channel and corresponding to the $n_{opt}^*$ directional direction.

13. A directional direction selection method, comprising:
receiving, by user equipment (UE), L groups of pilots by using L directional directions, wherein the L groups of pilots are sent by a base station in an omnidirectional direction manner, the L directional directions are in a one-to-one correspondence with the L groups of pilots, L is less than or equal to N, and N is a quantity of reconfigurable directional directions supported by the UE;
estimating, by the UE by using the L groups of pilots, channel quality corresponding to each directional direction in the L directional directions;
switching, by the UE, to a directional direction with best channel quality in the L directional directions; and
sending, by the UE, S groups of pilots by using the directional direction with the best channel quality in the L directional directions, wherein the S groups of pilots are received by the base station by using S directional directions, the S groups of pilots are in a one-to-one correspondence with the S directional directions, wherein $1 \leq S \leq M$, M is a quantity of reconfigurable directional directions supported by the base station, and the S groups of pilots are used by the base station to estimate channel quality corresponding to the S directional directions, and the channel quality is used to determine an optimal directional direction in the S directional directions.

14. The method according to claim 13, further comprising:
receiving, by the UE, $L_1$ groups of pilots by using $L_1$ directional directions, wherein the $L_1$ groups of pilots are sent by the base station by using the optimal directional direction, the $L_1$ directional directions are in a one-to-one correspondence with the $L_1$ groups of pilots, wherein $1 \leq L_1 \leq N$;
estimating, by the UE, channel quality corresponding to each directional direction in the $L_1$ directional directions;
switching, by the UE, to a directional direction with best channel quality in the $L_1$ directional directions, wherein the directional direction with the best channel quality is represented as an $n_{opt}^*$ directional direction; and
feeding back, by the UE, channel quality that is of each sub-channel and corresponding to the $n_{opt}^*$ directional direction.

15. A directional direction selection apparatus, comprising:
a processor and a memory, wherein the processor executes at least the following steps by running a software program stored in the memory and invoking data stored in the memory:
control a pattern reconfigurable antenna to send L groups of pilots in an omnidirectional direction manner, wherein the L groups of pilots are received by UE using L directional directions in a one-to-one correspondence with the L groups of pilots, the L groups of pilots are used by the UE to estimate channel quality corresponding to each directional direction in the L directional directions and switch to a directional direction with best channel quality in the L directional directions, wherein L is less than or equal to N, and N is a quantity of reconfigurable directional directions supported by the UE;
control the pattern reconfigurable antenna to send S groups of pilots by using S directional directions respectively, wherein the S groups of pilots are received by the UE by using the directional direction with the best channel quality in the L directional directions, the S groups of pilots are in a one-to-one correspondence with the S directional directions, wherein $1 \leq S \leq M$, M is a quantity of reconfigurable directional directions supported by the base station, and the S groups of pilots are used by the UE to estimate channel quality corresponding to the S directional directions;

determine an optimal directional direction in the S directional directions according to the channel quality corresponding to the S groups of pilots, wherein the optimal directional direction in the S directional directions is represented as an $m_{opt}$ directional direction; and control the pattern reconfigurable antenna to switch to the optimal directional direction in the S directional directions.

16. The apparatus according to claim 15, wherein the processor further executes the following step by running the software program stored in the memory and invoking the data stored in the memory:

allocate a sub-channel to each UE.

17. The apparatus according to claim 16, wherein after determining the optimal directional direction and before allocating the sub-channel to each UE, the processor further executes the following step by running the software program stored in the memory and invoking the data stored in the memory:

control the pattern reconfigurable antenna to send $L_1$ groups of pilots by using the $m_{opt}$ directional direction, wherein the $L_1$ groups of pilots are received by the UE by using $L_1$ directional directions, the $L_1$ directional directions are in a one-to-one correspondence with the $L_1$ groups of pilots, $1 \leq L_1 \leq N$, and the $L_1$ groups of pilots are used by the UE to estimate channel quality corresponding to each directional direction in the $L_1$ directional directions and switch to a directional direction with best channel quality in the $L_1$ directional directions.

18. A directional direction selection apparatus, comprising:

a processor and a memory, wherein the processor executes at least the following steps by running a software program stored in the memory and invoking data stored in the memory:

control a pattern reconfigurable antenna to receive L groups of pilots by using L directional directions, wherein the L groups of pilots are sent by a base station in an omnidirectional direction manner, the L directional directions are in a one-to-one correspondence with the L groups of pilots, wherein L is less than or equal to N, and N is a quantity of reconfigurable directional directions supported by user equipment UE;

estimate, by using the L groups of pilots, channel quality corresponding to each directional direction in the L directional directions;

control the pattern reconfigurable antenna to switch to a directional direction with best channel quality in the L directional directions;

control the pattern reconfigurable antenna to receive, by using the directional direction with the best channel quality, S groups of pilots that are sent by the base station by using S directional directions, wherein the S groups of pilots are in a one-to-one correspondence with the S directional directions, wherein $1 \leq S \leq M$, and M is a quantity of reconfigurable directional directions supported by the base station;

estimate, by using the S groups of pilots, channel quality corresponding to the S directional directions; and feedback channel quality information or a directional direction with best channel quality in the S directional directions, so that the base station determines an optimal directional direction in the S directional directions, wherein the channel quality information comprises the channel quality corresponding to the S directional directions, or the directional direction with the best channel quality in the S directional directions and channel quality corresponding to the directional direction with the best channel quality in the S directional directions.

19. The apparatus according to claim 18, wherein the processor further executes the following steps by running the software program stored in the memory and invoking the data stored in the memory:

control the pattern reconfigurable antenna to receive $L_1$ groups of pilots by using $L_1$ directional directions, wherein the $L_1$ groups of pilots are sent by the base station by using the optimal directional direction, the $L_1$ directional directions are in a one-to-one correspondence with the $L_1$ groups of pilots, and $1 \leq L_1 \leq N$;

estimate channel quality corresponding to each directional direction in the $L_1$ directional directions;

control the pattern reconfigurable antenna to switch to a directional direction with best channel quality in the $L_1$ directional directions, wherein the directional direction with the best channel quality is represented as an $n_{opt}{}^*$ directional direction; and feedback channel quality that is of each sub-channel and corresponding to the $n_{opt}{}^*$ directional direction.

20. A directional direction selection system, comprising:

a reconfigurable antenna: and a directional direction selection apparatus as described in claim 18.

* * * * *